United States Patent
Rygh et al.

(10) Patent No.: US 9,224,186 B2
(45) Date of Patent: Dec. 29, 2015

(54) MEMORY LATENCY TOLERANCE IN BLOCK PROCESSING PIPELINES

(71) Applicant: Apple Inc., Cupertino, CA (US)

(72) Inventors: Mark P. Rygh, Union City, CA (US); Guy Cote, San Jose, CA (US); Timothy John Millet, Mountain View, CA (US); Joseph J. Cheng, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 14/039,804

(22) Filed: Sep. 27, 2013

(65) Prior Publication Data

US 2015/0091920 A1    Apr. 2, 2015

(51) Int. Cl.
  *G06T 1/20*      (2006.01)
  *G06T 1/60*      (2006.01)
  *H04N 19/423*    (2014.01)
  *H04N 19/436*    (2014.01)
  *H04N 19/176*    (2014.01)

(52) U.S. Cl.
  CPC ... *G06T 1/20* (2013.01); *G06T 1/60* (2013.01); *H04N 19/176* (2014.11); *H04N 19/423* (2014.11); *H04N 19/436* (2014.11)

(58) Field of Classification Search
  None
  See application file for complete search history.

(56) References Cited

U.S. PATENT DOCUMENTS

| | | | |
|---|---|---|---|
| 5,486,876 A * | 1/1996 | Lew et al. | 348/719 |
| 6,690,727 B1 * | 2/2004 | Mehta | 375/240.12 |
| 7,720,311 B1 * | 5/2010 | Sriram | 382/299 |
| 7,944,502 B2 * | 5/2011 | Mohapatra et al. | 348/448 |
| 8,332,590 B1 | 12/2012 | Rohana et al. | |
| 2003/0196078 A1 | 10/2003 | Wise et al. | |
| 2006/0007234 A1 * | 1/2006 | Hutchins et al. | 345/506 |
| 2006/0018562 A1 * | 1/2006 | Ruggiero | 382/300 |
| 2006/0018563 A1 * | 1/2006 | Ruggiero | 382/300 |
| 2006/0022984 A1 * | 2/2006 | Ruggiero | 345/506 |
| 2007/0046821 A1 * | 3/2007 | Mead et al. | 348/571 |
| 2007/0110160 A1 | 5/2007 | Wang et al. | |
| 2007/0165035 A1 | 7/2007 | Duluk, Jr. et al. | |
| 2007/0189390 A1 | 8/2007 | Pappas et al. | |

(Continued)

OTHER PUBLICATIONS

U.S. Appl. No. 14/037,318, filed Sep. 25, 2013, Marc A. Schaub, et al.

(Continued)

*Primary Examiner* — Kee M Tung
*Assistant Examiner* — Ryan M Gray
(74) *Attorney, Agent, or Firm* — Robert C. Kowert; Meyertons Hood, Kivlin, Kowert & Goetzel, P.C.

(57) ABSTRACT

Memory latency tolerance methods and apparatus for maintaining an overall level of performance in block processing pipelines that prefetch reference data into a search window. In a general memory latency tolerance method, search window processing in the pipeline may be monitored. If status of search window processing changes in a way that affects pipeline throughput, then pipeline processing may be modified. The modification may be performed according to no stall methods, stall recovery methods, and/or stall prevention methods. In no stall methods, a block may be processed using the data present in the search window without waiting for the missing reference data. In stall recovery methods, the pipeline is allowed to stall, and processing is modified for subsequent blocks to speed up the pipeline and catch up in throughput. In stall prevention methods, processing is adjusted in advance of the pipeline encountering a stall condition.

20 Claims, 29 Drawing Sheets

(56) References Cited

U.S. PATENT DOCUMENTS

| | | | |
|---|---|---|---|
| 2008/0147980 A1* | 6/2008 | Peters et al. | 711/133 |
| 2008/0285652 A1* | 11/2008 | Oxman et al. | 375/240.16 |
| 2011/0135008 A1* | 6/2011 | Han et al. | 375/240.24 |
| 2011/0286523 A1* | 11/2011 | Dencher | 375/240.14 |
| 2014/0092969 A1* | 4/2014 | Lee et al. | 375/240.15 |

OTHER PUBLICATIONS

ITU-T H2.64 "Series H: Audiovisual and Multimedia Systems Infrastructure of Audiovisual Services—Coding of Moving Video—Advanced video coding for generic audiovisual services" Apr. 2013 pp. 1-732.

\* cited by examiner

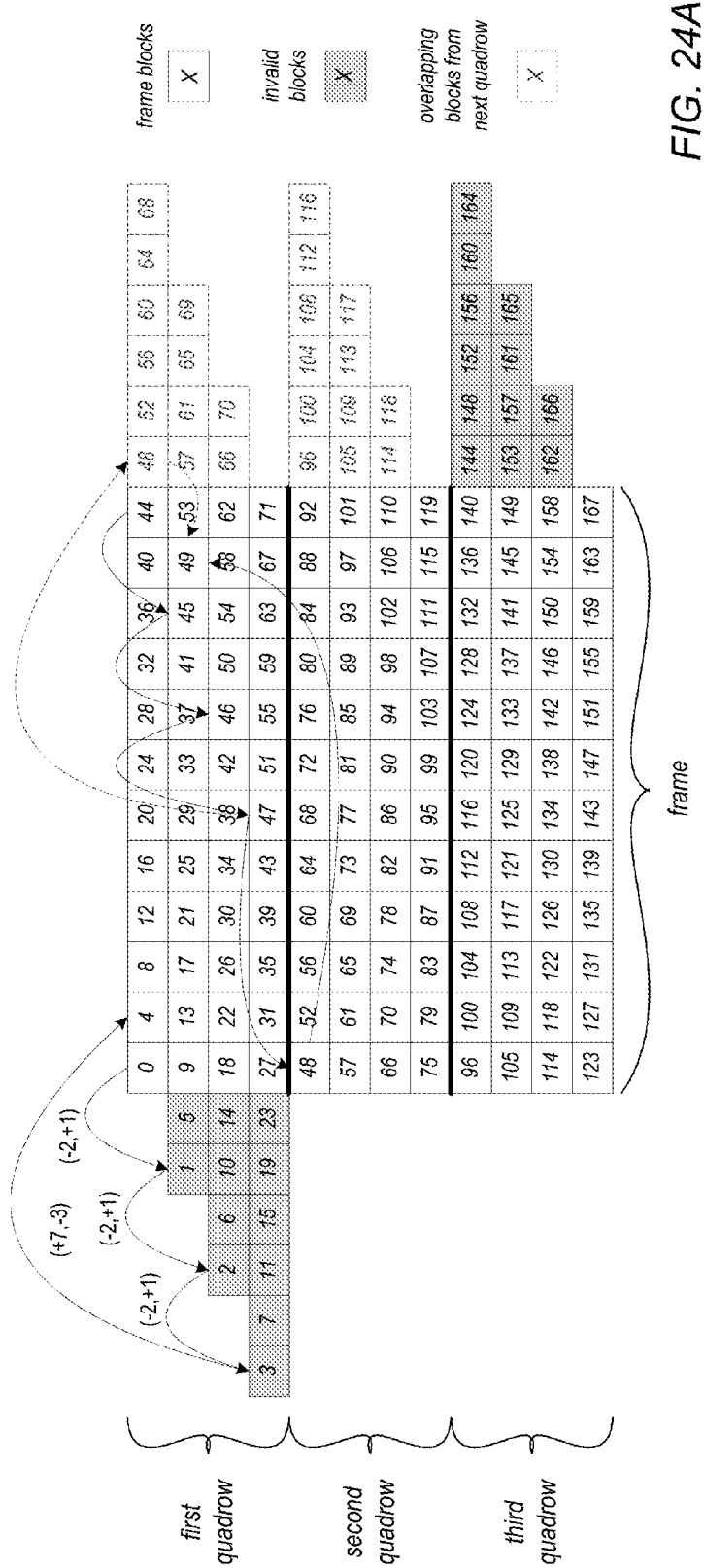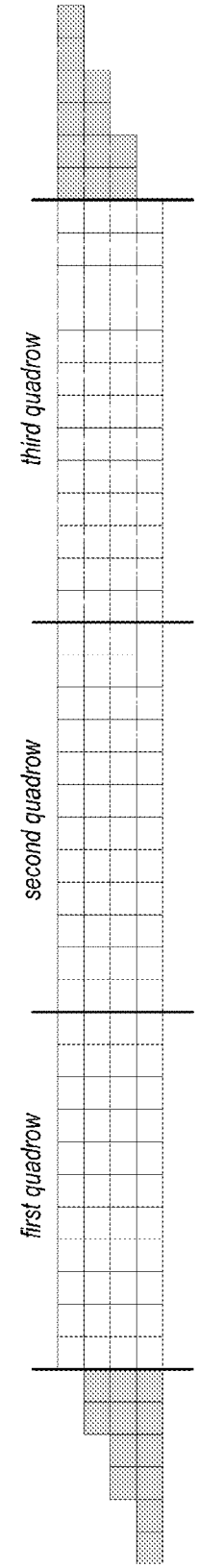
FIG. 24A
FIG. 24B

MEMORY LATENCY TOLERANCE IN BLOCK PROCESSING PIPELINES

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of memory latency tolerance methods are described that may help maintain an overall level of performance in block processing pipelines at times when the memory system is causing delays in delivery of prefetched reference frame data. In a block processing pipeline, pixel data from a reference frame may be prefetched into a local memory (referred to as a search window memory) for access by one or more stages of a pipeline. The search window may be advanced by one column of blocks by initiating a prefetch for a next column of reference data from memory that stores the reference frame prior to the pipeline advancing to a first block for which the reference data in the column is needed. However, there may be occasions in which reference data requested by one or more prefetch requests arrives late due to delays in the memory system. If this occurs, one or more blocks or columns of reference data needed to process a particular block may not be in the search window when the block arrives at a stage of the pipeline that processes blocks according to the reference data in the search window, which might stall the pipeline.

Memory latency tolerance methods are described that may help maintain an overall level of performance in block processing pipelines at times when the memory system is causing delays in delivery of prefetched reference frame data. In a general memory latency tolerance method, search window processing in the pipeline may be monitored. Monitoring search window processing may include, but is not limited to, monitoring content of the search window, monitoring operations of one or more stages of the pipeline, and/or monitoring performance of the memory system. If status of one or more of the elements being monitored changes in a way that may affect pipeline throughput, then search window processing may be modified in response to the change. The modification may be performed according to one or more memory latency tolerance methods.

The memory latency tolerance methods may include, but are not limited to, one or more methods in which stage(s) do not stall the pipeline when reference data is missing for a block and one or more methods in which stage(s) are allowed to stall the pipeline, but steps are taken after a stall so that the pipeline can catch up. The former may be referred to as no stall methods, and the second may be referred to as stall recovery methods. In no stall methods, the block may be processed at one or more stages without using at least the missing reference data. In other words, instead of waiting for the missing reference data, the block is processed using reference data that is present in the search window when the block arrives at the stage. In stall recovery methods, block processing at one or more stages of the pipeline may be modified for at least some future blocks to speed up the pipeline and thus allow the pipeline to catch up in throughput to maintain the desired overall level of performance. In addition to the above, the memory latency tolerance methods may also include one or more methods in which pipeline processing is proactively adjusted upon detecting that the memory system may be running behind, and thus in advance of the pipeline encountering a stall condition. These methods may be referred to as stall prevention methods.

BRIEF DESCRIPTION OF THE DRAWINGS

FIGS. 24A and 24B graphically illustrate the knight's order processing method including the algorithm for determining a next block, according to at least some embodiments.

Figure 1:
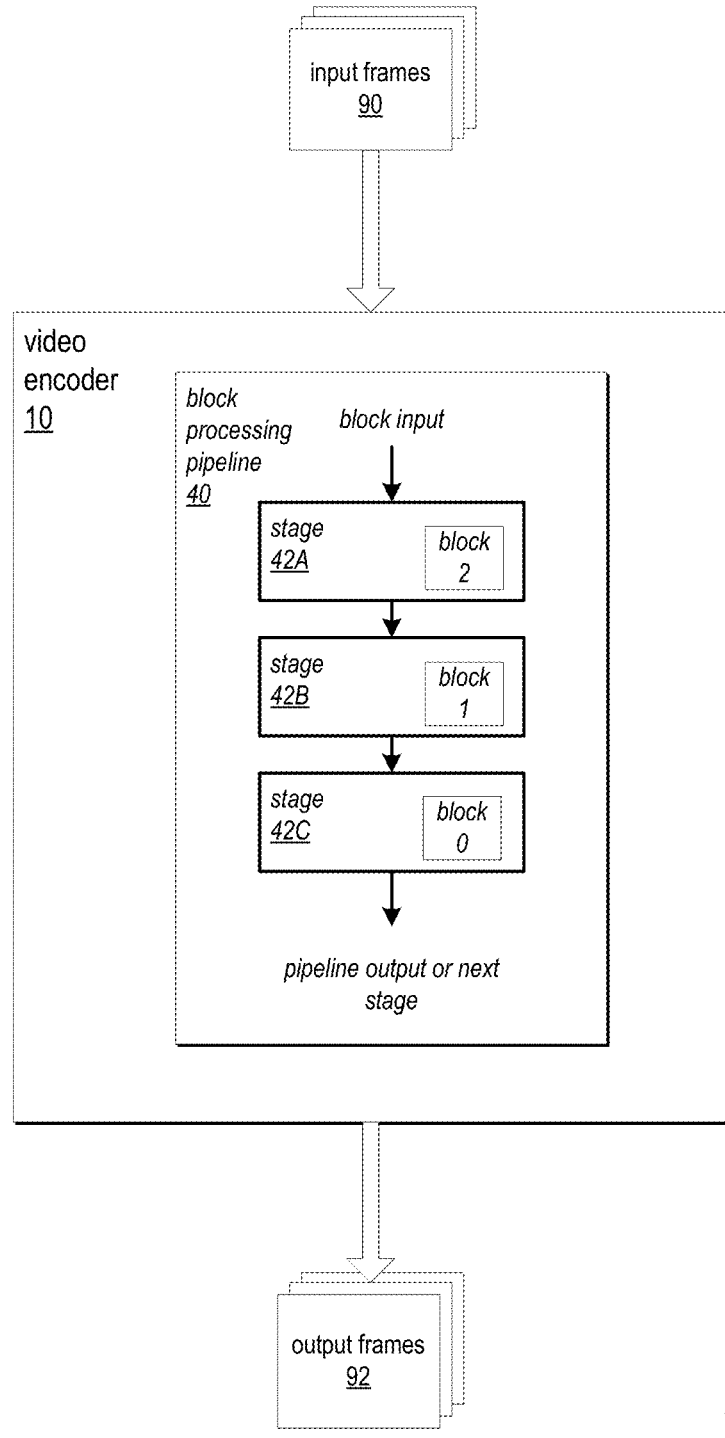
FIG. 1 illustrates an example video encoder including a conventional block processing pipeline that processes blocks from input frames in scan order.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 27:
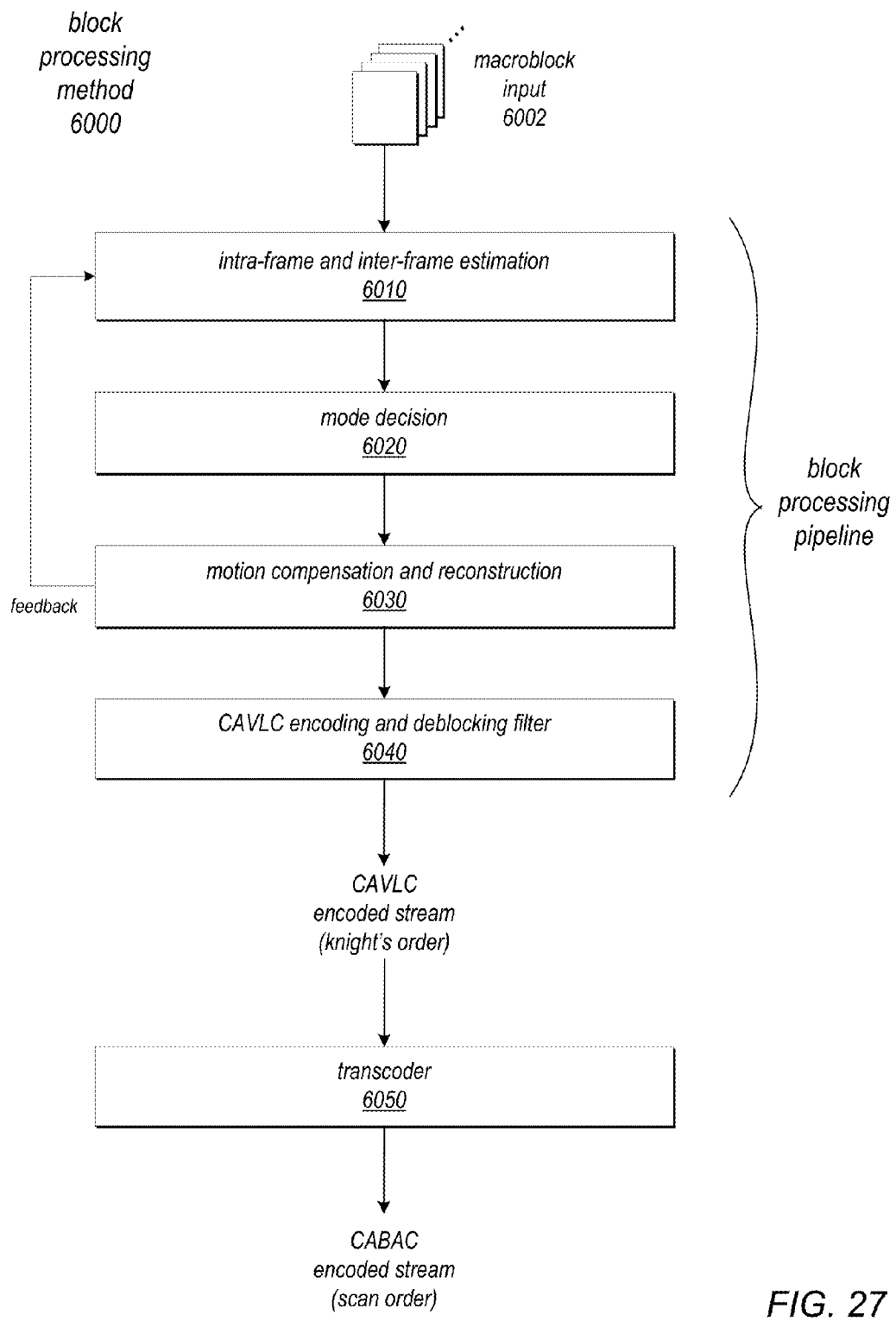
FIG. 27 is a high-level block diagram of general operations in an example block processing method that may be implemented by a block processing pipeline that implements one or more of the block processing methods and apparatus described herein, according to at least some embodiments.
Figure 28:
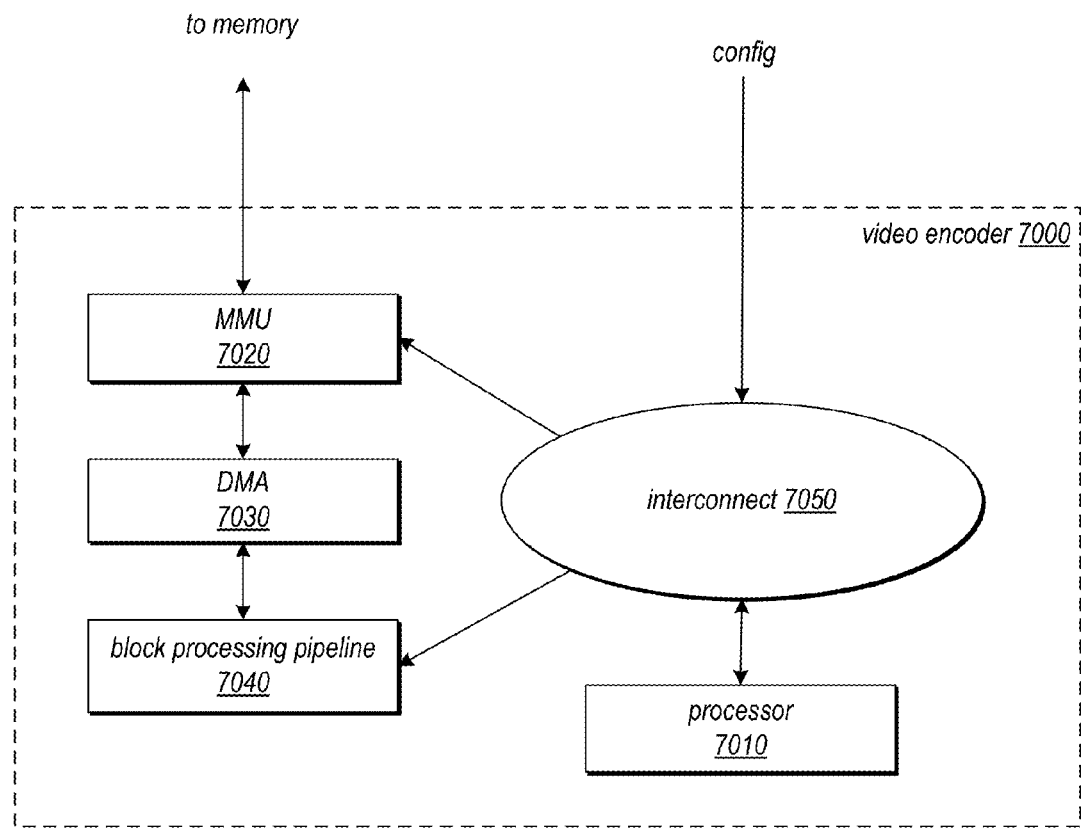
FIG. 28 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 27 illustrates an example block processing pipeline of an example H.264 video encoder, and FIG. 28 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Reference Frame Data Prefetching in Block Processing Pipelines

Embodiments of block processing pipeline methods and apparatus are described in which pixel data from a reference frame is prefetched into a local memory (e.g., SRAM (static random access memory)) for access by one or more stages of a pipeline. The local memory may be referred to as a search window memory, or search window. The pipeline processes blocks of pixels from an input frame in groups of two or more rows (e.g., in row groups each containing four rows of blocks). The one or more stages may each process a block from the input frame currently at the respective stage according to a corresponding region of pixels from the reference frame that is stored in the search window memory. The search window may store multiple rows and columns of blocks of pixels from the reference frame, and may be appropriately sized so that the width and height of the search window is sufficient to at least encompass two or more overlapping regions of pixels from the reference frame corresponding to two or more blocks, each block from a different row and column in the input frame, that are currently being processed in the pipeline. Thus, the one or more stages may process blocks from multiple rows of an input frame using one set of pixel data from a reference frame that is stored in a shared search window memory.

In at least some embodiments, the search window is advanced by one column of blocks by prefetching a column of reference data from a memory. However, the reference data in the prefetched column is only used when input to the pipeline advances to a block that is to the right of the current blocks being processed in the pipeline, for example when input proceeds to the top row of the row group. Thus, the prefetch does not need to be performed for each input block, but instead may be performed once per the number of rows in the row group. For example, in a pipeline that inputs and processes blocks in groups of four rows, with each block input from a next row in the row group, the prefetch only needs to be performed once every four input blocks. This reduces the number of fetches from the memory that need to be performed when compared to conventional pipeline processing methods, and also provides latency for performing the fetch.

Figure 3:
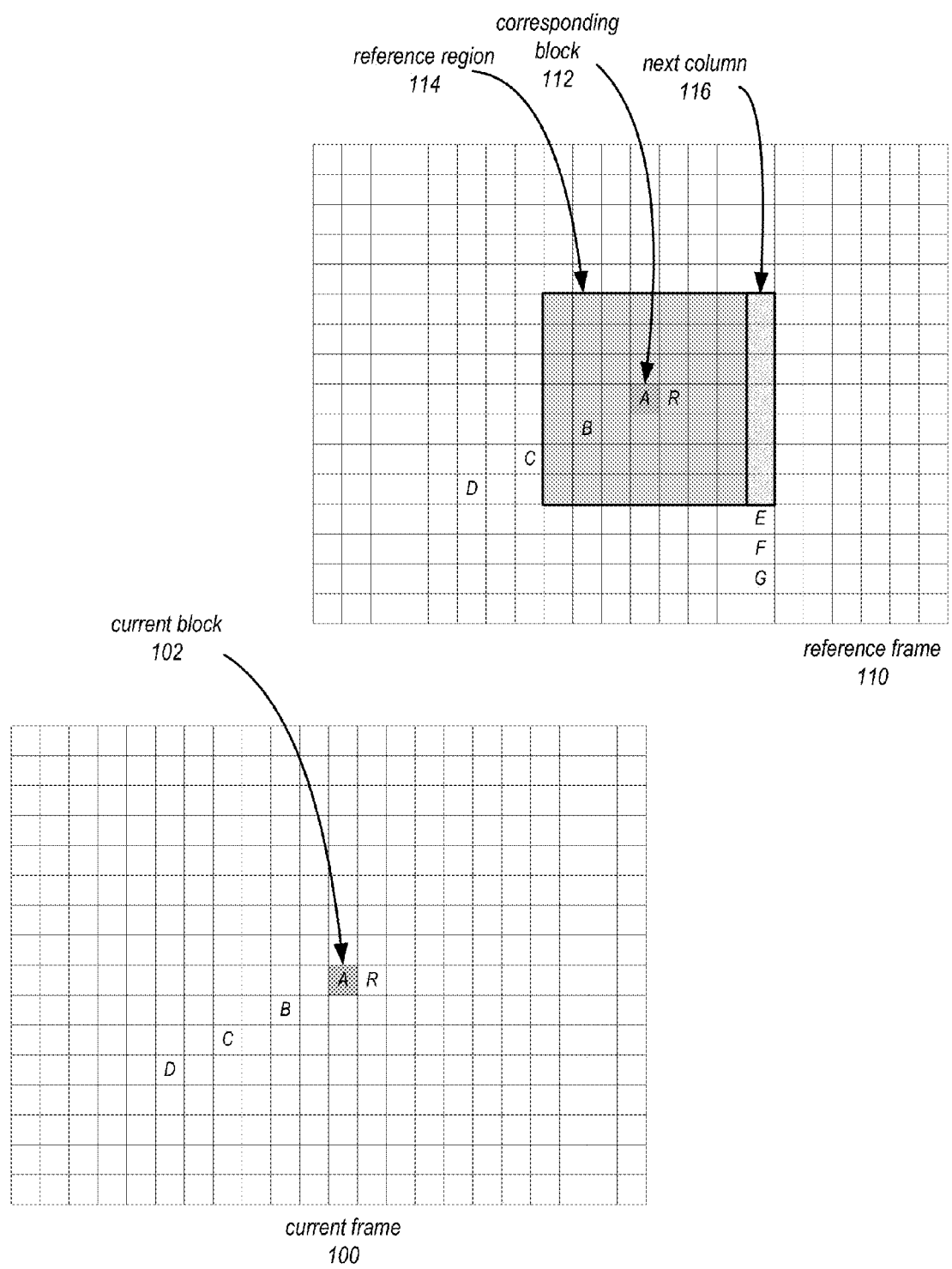
FIG. 3 graphically illustrates an example search region in a reference frame, according to at least some embodiments.

FIG. 3 graphically illustrates an example search region in a reference frame, according to at least some embodiments. Current frame 100 is being processed in a pipeline. Current block 102 (block A) represents a block from frame 100 that is at a stage of the pipeline that uses reference data from a reference frame 110. Reference frame 110 represents a frame that was previously processed by the pipeline and output to an external memory. Corresponding block 112 in the reference frame 110 represents a block at a location that corresponds to the location of current block 102 in current frame 100. Reference region 114 represents a region of pixels in reference frame 110 around corresponding block 112 that is to be used as reference data for current block 102. In this example, reference region 114 is a 7×7 block region. The reference region 114 may be fetched from an external memory that stores the reference frame 110 and stored in a memory local to the pipeline for access by the stage. Note that the size and shape of the reference region 114 is just an example, and is not intended to be limiting. The reference region 114 may be square as shown in FIG. 3, or may be rectangular, substantially circular, or of other shapes.

Figure 2:
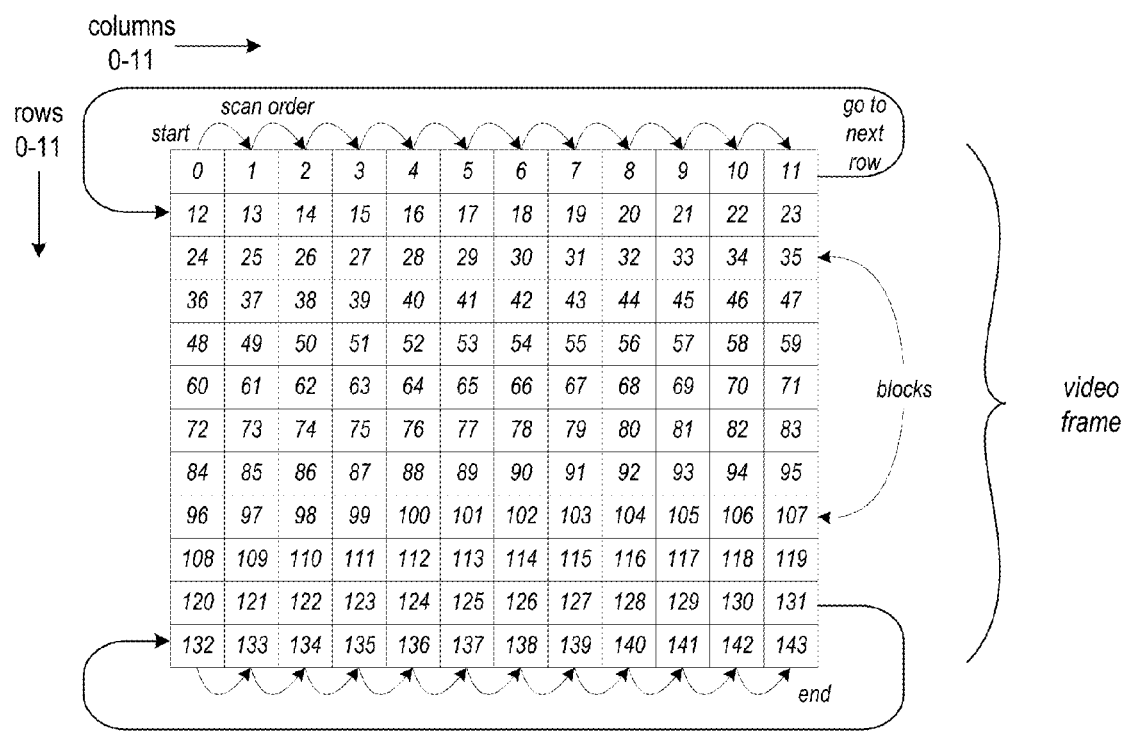
FIG. 2 illustrates conventional scan order processing of blocks from a video frame.

The block labeled R in current window 100 represents the block immediately to the right of block A, and is the next block input to the pipeline after current block 102 when inputting the blocks according to scan order as shown in FIGS. 1 and 2. To advance the reference region 114 in reference frame 110 to process a next block in scan order (block R) at the stage, at least a next column 116 would need to fetched from the reference frame 110 and stored to the local memory that locally stores the reference region 114. Similarly, when the pipeline advances to the next block in scan order (the block immediately to the right of block R), at least the next column to the right of column 116 would need to be fetched. Thus, conventionally, a fetch from an external memory may be required for each block when processing in scan order.

In at least some embodiments, instead of inputting blocks in scan order, a block processing pipeline may process blocks according to knight's order as described in the section titled Knight's order processing. The rows of blocks in the input frame may be divided into groups or sets of two or more rows, with the knight's order input of blocks constrained by the row group boundaries. For example, the row groups may each include four rows in some embodiments. In at least some embodiments, assuming r as the number of rows in a row group used to constrain the knight's order input, a genera knight's order input algorithm may be given as:

If not on the bottom row of a row group,
  The next block is p columns left, one row down (−p,+1).
Otherwise, at the bottom row of a row group:
  The next block is q columns right, (r−1) rows up (+q,−(r−1)).

In FIG. 3, assuming that p is 2, and that r is 4, in knight's order the next block input to the pipeline after block A would be block B, followed by blocks C and D. Block R would not be input until after block D, and thus four blocks after block A. By using an expanded search window memory that encompasses at least the search regions around each of blocks A, B, C, and D for local storage of reference data, instead of fetching at least a next column for each block, a next column of blocks only needs to be fetched every four blocks. Three (r−1) additional blocks are fetched, as shown by blocks E, F, and G in reference frame 110, to cover the search regions for all the rows in the row group in the search window. The search window may include at least one column into which the reference data may be prefetched. For example, a request for the reference data from the next column 116 may be generated when block A enters the pipeline or is at a particular stage in the pipeline, which would thus prefetch the new column of reference data that will be needed when processing block R. This gives four cycles to fetch the column of reference data from external memory and store the reference data in the search window before it will be needed for block R.

Figure 4:
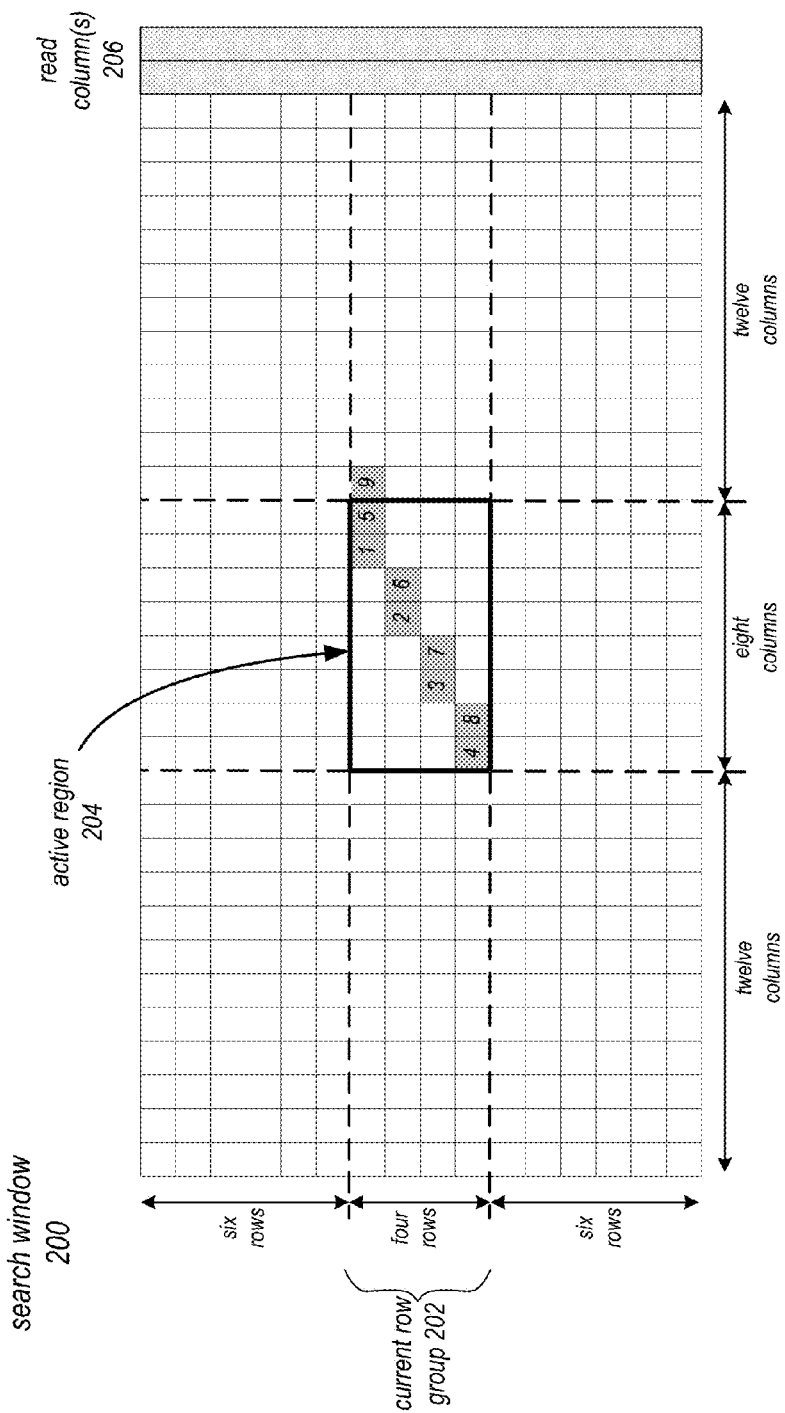
FIG. 4 graphically illustrates an example search window, according to at least some embodiments.

FIG. 4 graphically illustrates an example search window 200, according to at least some embodiments. FIG. 4 assumes that a knight's order processing method is used in which rows are processed in groups of four rows as shown by row group 202, and in which the basic knight's order input method is:
  If not on the bottom row of a quadrow:
    The next block is two columns left, one row down (−2,+1).
  Otherwise, at the bottom row of a quadrow:
    The next block is seven columns right, three rows up (+7,−3).

In addition, FIG. 4 assumes that the search region for a given block is a 25×13 rectangle. Active region 204 of search window 200 includes all blocks in the current frame for which reference data is currently available in search window 200. In this example, the active region 204 is eight columns wide and four rows high. To encompass the reference data for the blocks on the top and bottom rows and the left and right columns of active region 204, the search window 200 in this example is at least 32 columns wide by 16 rows high. The search window 200 may also include one or more additional columns as read columns 206 for prefetching reference data.

The shaded blocks numbered 1 through 9 in search window 200 represent nine blocks processed in the pipeline according to knight's order, beginning at block 1. The active region 204 does not advance one column until block 9 becomes active. A prefetch of a next column of reference data into a read column 206 may be performed before block 9 becomes active. In at least some embodiments, the prefetch may be initiated when block 5 becomes active. Thus, the fetching of the new column of reference data may have four pipeline stages or cycles (four blocks) to complete before the data is needed. In some embodiments, more than one read column 206 may be used, for example two read columns 206. In these embodiments, a prefetch may be initiated more than four cycles ahead of when the data is needed. For example, the prefetch of the next column for block 9 may be initiated when block 1 becomes active, eight cycles ahead of when the data is needed.

When the active region 204 advances a column, the reference data oldest column in the search window 200 (the column farthest to the left in FIG. 4) is no longer needed. Thus, this column becomes stale, and may for example be used as a read column 206.

Note that the search window 200 shown in FIG. 4 is an example, and is not intended to be limiting. For example, the size a of the active region 204 may vary depending on the particular knight's order input method that is used and also on the number of rows per row group. The number of rows above and below the active region 204 and the number of columns to the left and right of the active region 204 may vary depending on the dimensions of the search region around each block that is used. For example, given the example 7×7 block search region shown in FIG. 3, the search window 200 (assuming the active region 204 as shown in FIG. 4) would be 14 columns wide by 8 rows high, plus one or more read columns 206.

Figure 5A:
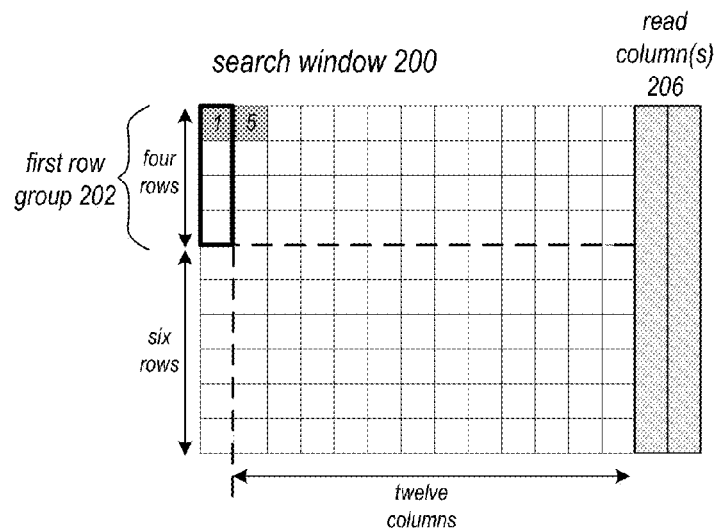
FIGS. 5A and 5B graphically illustrate edge conditions for the search window, according to at least some embodiments.
Figure 5B:
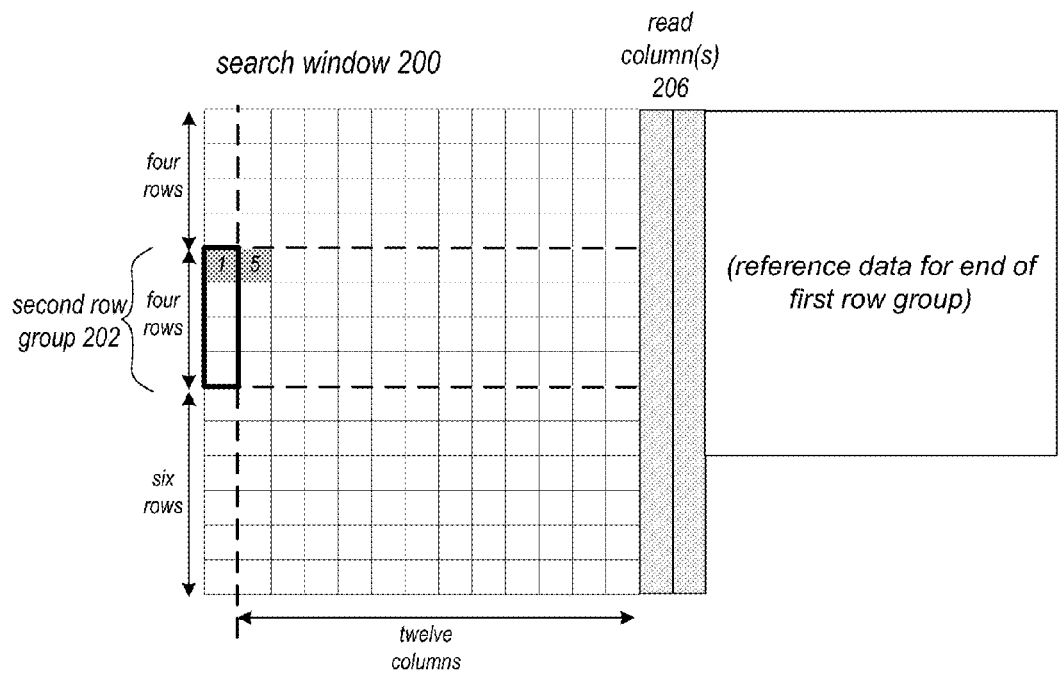

FIGS. 5A and 5B graphically illustrate edge conditions for the search window, according to at least some embodiments. Edge or boundary conditions exist at the start and end of each row group in an input frame. An initial condition exists at the start of the first row group in the input frame, as shown in FIG. 5A. Initially, the search window 200 does not include any reference data. Thus, for a first block on the first row of the first row group 202 (shown as block 1 in FIG. 5A), the search window 200 may be initialized by reading in a subregion of reference data from the reference frame. Since there is no reference data above or to the left of the first block, this subregion encompasses at least the search region below and to the right of the location of block 1 in the reference frame, with three additional rows to account for the other three rows in the row group 202. Using the example search window shown in FIG. 4, the subregion may be at least 13 columns wide by 10 columns high. Note that one or more additional columns 10 blocks high may be included in the subregion initially read into the search window 200. Prior to or upon reaching block 5 as shown in FIG. 5A, a next column of 10 blocks may be prefetched into a read column 206.

FIG. 5B illustrates an edge condition when the knight's order input method proceeds to the next row group. As described in the section titled Knight's order processing, the knight's order processing method may treat the row groups as if they are horizontally arranged and thus may overlap the row groups in the pipeline so that the knight's order input method may continue without special handling. In at least some embodiments, once the right edge of the search window 200 reaches the right edge of the reference frame, the prefetches of columns of reference data from the reference frame may fetch columns of reference data blocks beginning at the left edge of the reference frame, shifted down one row group (thus now fetching 14 blocks in each column instead of 10 as in FIG. 5A), to begin prefetching reference data for the input frame blocks in the next row group. Once the first block in the next row group of the input frame is active in the pipeline (shown as block 1 in FIG. 5B), the search window 200 should include the blocks from the reference frame needed to process the first block, as shown in FIG. 5B. Alternatively, a subregion that includes at least the 13 columns of blocks shown in FIG. 5B may be read from the reference frame into the search window 200 when the block input method jumps to the next row group. Prior to or upon reaching block 5 as shown in FIG. 5B, a next column of 10 blocks may be prefetched into a read column 206. As shown in FIG. 5B, at the beginning of a next row group (in this example, the second row group), in addition to the reference data needed to process initial block(s) in the next row group, the search window 200 may still include at least the reference data necessary for processing any remaining blocks near the end of the previous row group at least until those blocks are no longer active.

Figure 6:
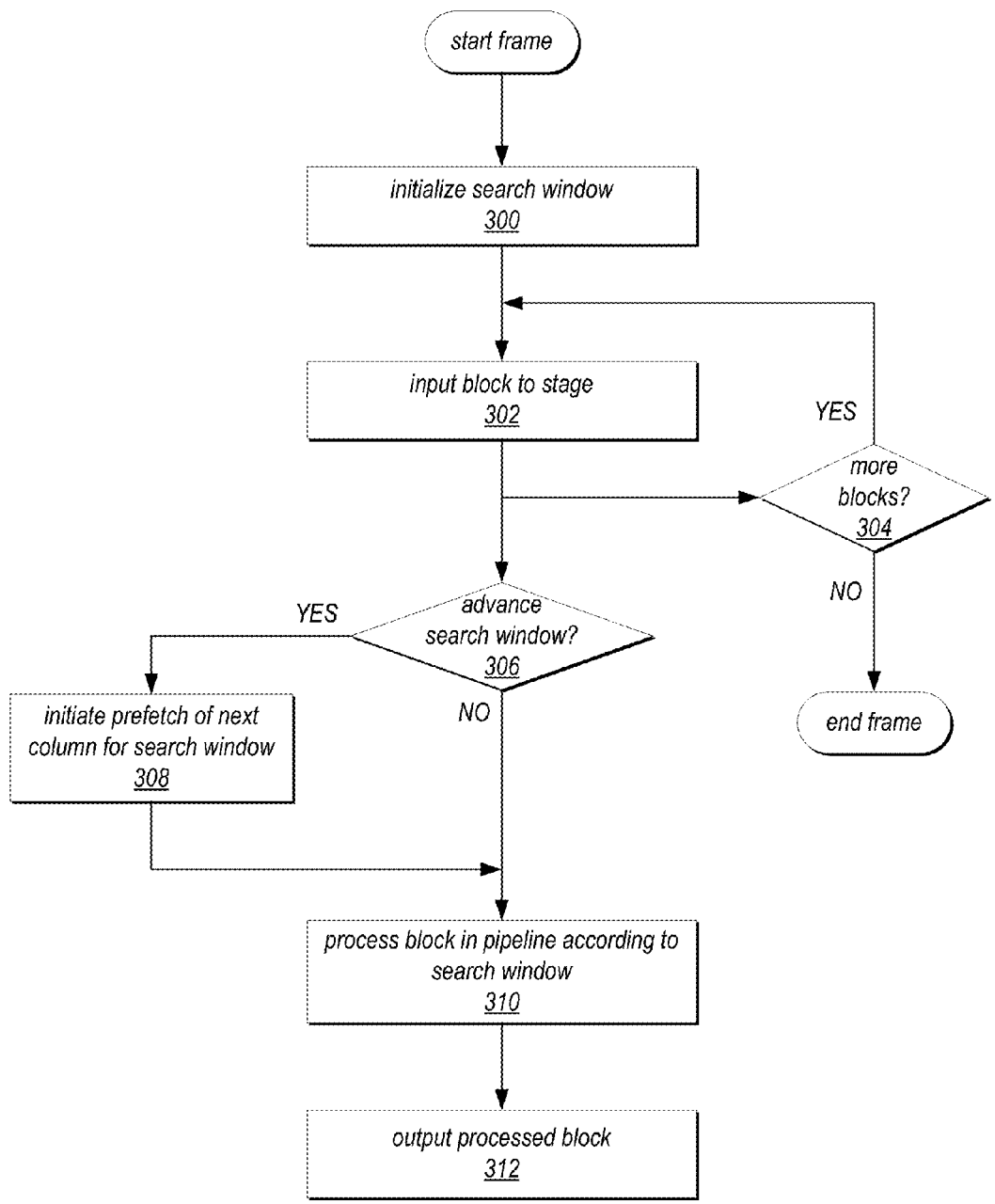
FIG. 6 is a flowchart of a method for prefetching reference data into a search window when processing an input frame in a block processing pipeline, according to at least some embodiments.

FIG. 6 is a flowchart of a method for prefetching reference data into a search window when processing an input frame in a block processing pipeline, according to at least some embodiments. As indicated at 300, the search window may be initialized with reference data from a reference frame to be used in processing the input frame, for example as described in reference to FIG. 5A. The search window may be initialized prior to, upon, or after a first valid block from the frame to be processed is input to the pipeline. The initialization fetches at least the reference data from the reference frame that will be needed in processing the first block in the input frame.

In elements 302 through 312, blocks in the input frame are processed in and output by the pipeline. As indicated at 302, a block is input to a stage of the pipeline at which prefetches for a next column of reference data are initiated. This stage may be, but is not necessarily, a first stage in the pipeline. As shown by 304, the input of blocks to the stage in the pipeline continues as long as there are blocks to be processed. Each block that is input is to be processed in the pipeline according to the current search window, as indicated at 310. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. One or more of the stages may access the reference data in the search window when processing a block.

At 306, if the search window is to be advanced at this block, then a prefetch of a next column of reference data for the search window may be initiated as indicated at 308. Otherwise, no fetch is initiated at this block. In at least some embodiments, the decision on whether to initiate a fetch for a block may be based on which row of the row group the block is from. For example, in at least some embodiments, a prefetch may be initiated only at blocks that are in the top row of the row group. Thus, a fetch from the memory where the reference frame is stored may only be initiated once every r blocks, where r is the number of rows in a row group. In at least some embodiments, the prefetch is initiated to obtain a next column of reference data that will not be needed for at least r blocks, where r is the number of rows in a row group. Thus, the memory system has at least r blocks or pipeline cycles to fetch the reference data into the search window before the reference data is needed.

As indicated at 310, the block may be processed at the stage(s) of the pipeline according to the reference data in the search window. As indicated at 312, once a block has been processed by a last stage of the pipeline, the processed block is output, for example to a memory via direct memory access (DMA).

Once all the blocks in the input frame have been processed in the pipeline and output to a memory, the processed input frame may itself be used as a reference frame for one or more other frames when processed in the pipeline.

Example Search Window Implementations

FIGS. 7A through 9 illustrate example implementations of search windows into which reference data may be prefetched as described above, and are not intended to be limiting. The search windows and search window methods described herein may be used in hardware or software block processing pipeline implementations in which, instead of processing blocks in scan order, blocks are input to the pipeline(s) according to groups of rows, for example using a knight's order processing method to a block processing pipeline as described in the section titled Knight's order processing, or alternatively using parallel pipelines. For the sake of this discussion, the block input method(s) for the pipeline(s) input blocks in groups of r rows, beginning at a top row and with each subsequent block input from a next row, returning to the top row after inputting a block from the bottom row.

Figure 8:
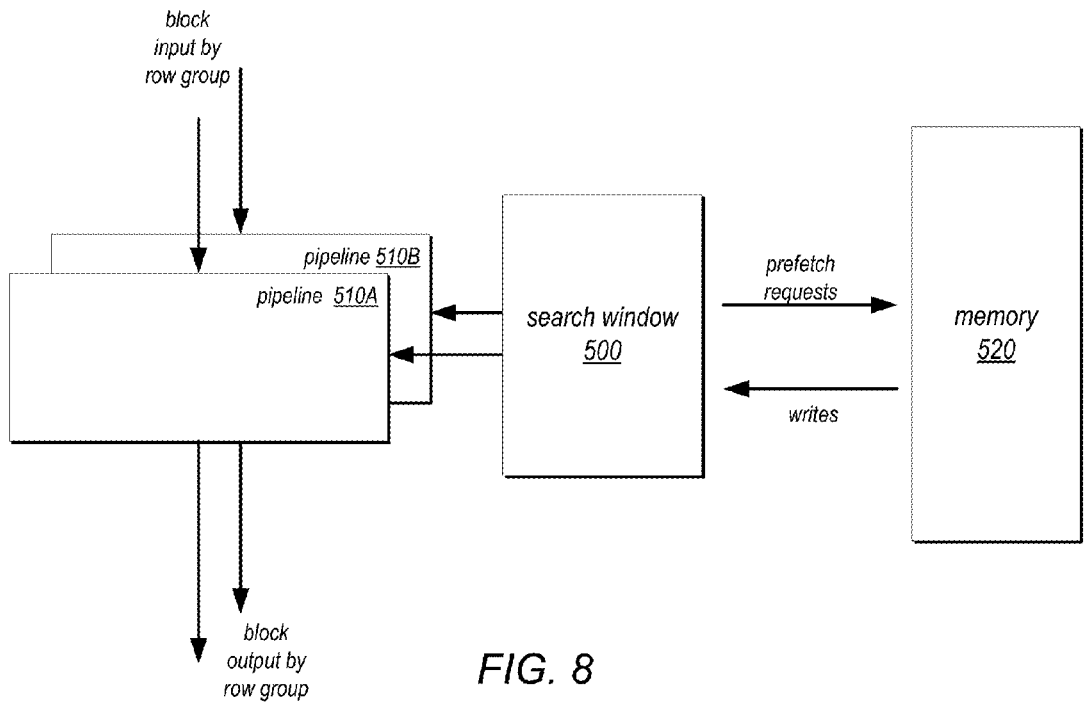
FIG. 8 shows an example implementation in which two block processing pipelines are used to process adjacent row groups from an input frame in parallel, sharing a same search window, according to at least some embodiments.
Figure 9:
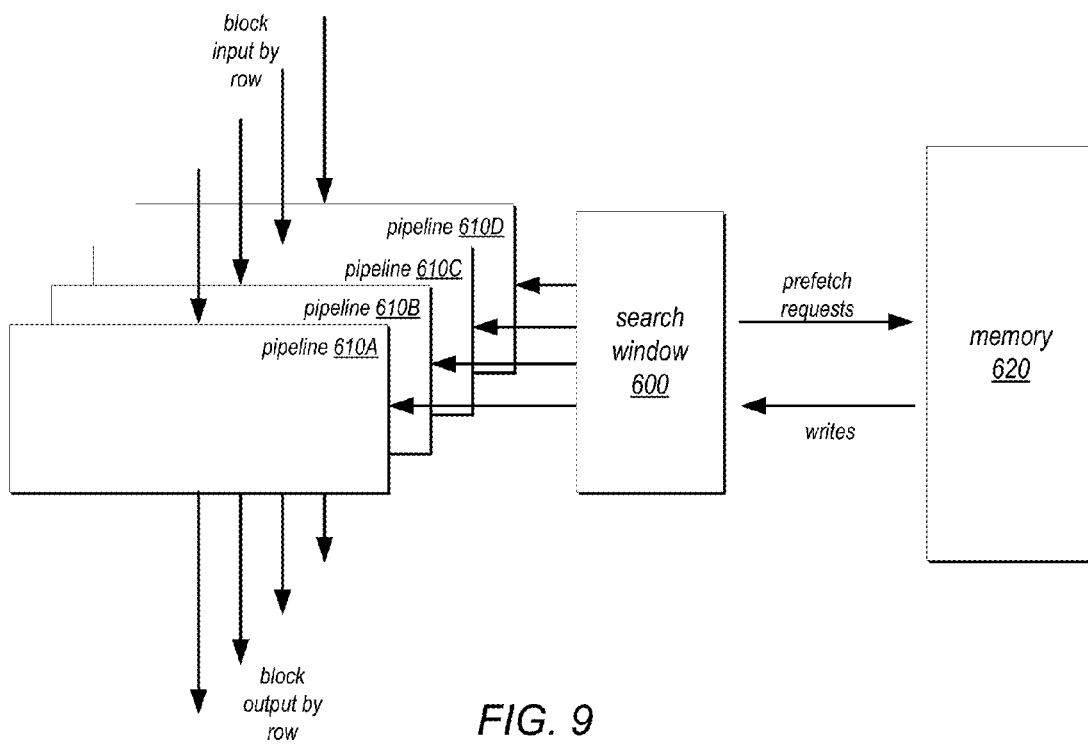
FIG. 9 shows an example implementation in which multiple pipelines are used to process adjacent rows from an input frame in parallel, sharing a same search window, according to at least some embodiments.
Figure 10:
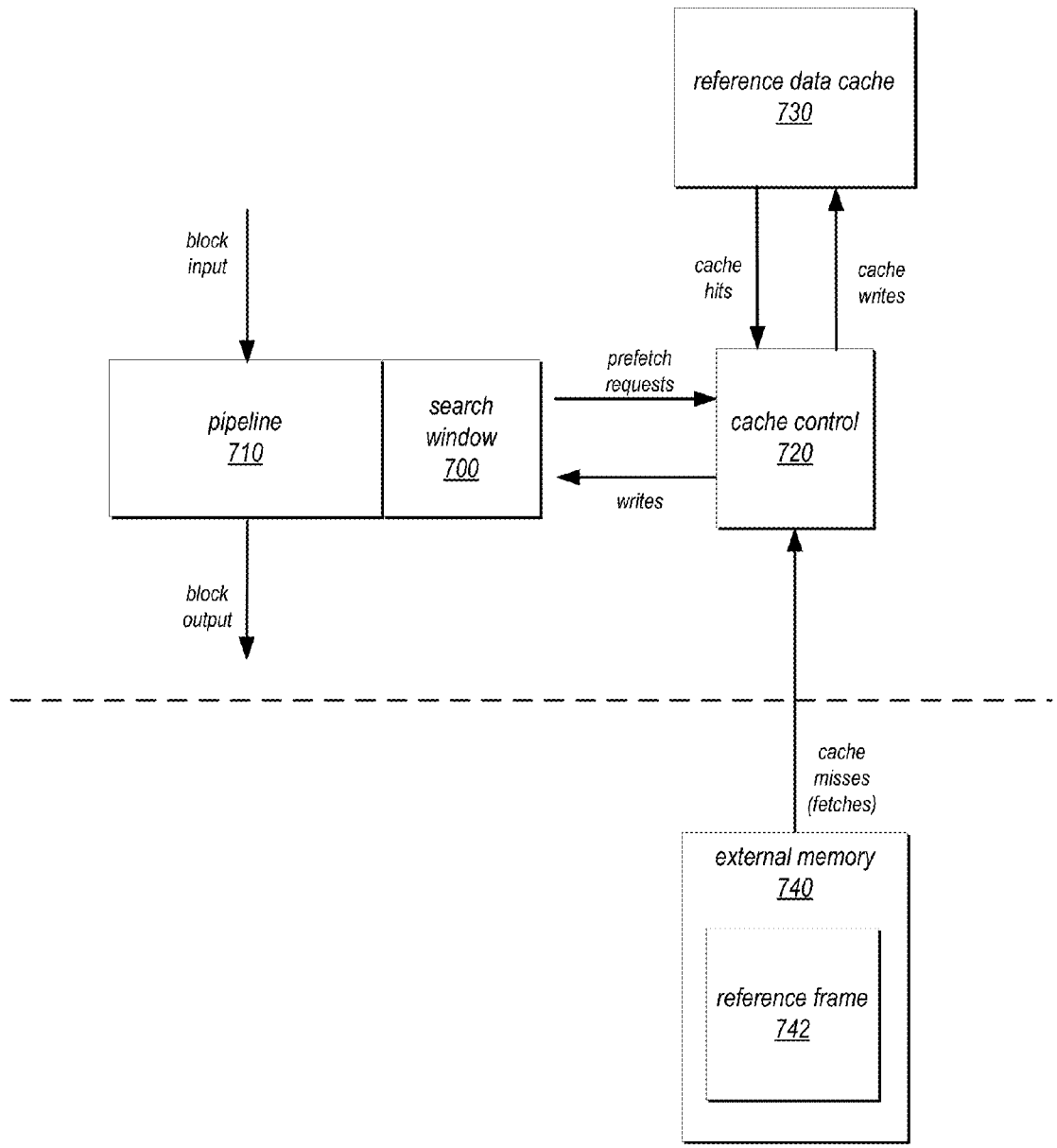
FIG. 10 illustrates using a cache memory to cache a portion of a reference frame, according to at least some embodiments.

In FIGS. 7A through 9, the search windows may, for example, be implemented as or in SRAM (static random access memory) that is local to the pipeline(s) or apparatus that implements the pipeline(s) (e.g., a video encoder as shown in FIG. 28), although other memory technologies may be used. The memory from which reference data is fetched may include memory of the apparatus that implements the pipeline(s) and/or memory that is external to the apparatus. In some embodiments, the memory from which reference data is fetched may include both an external memory in which reference frame(s) are stored and a local memory that may be used to cache portions of reference frame(s) fetched from the external memory, for example as shown in FIG. 10.

Figure 7A:
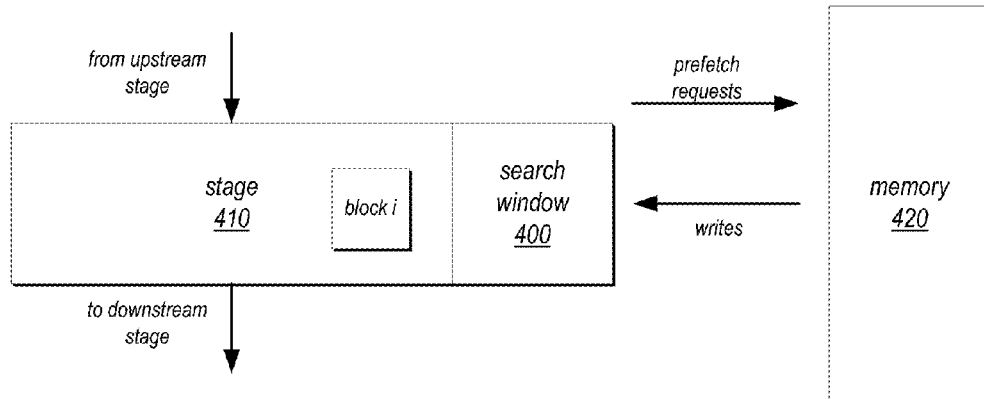
FIG. 7A illustrates a single stage of a pipeline that utilizes a search window for reference data from a reference frame stored in a memory, according to at least some embodiments.

FIG. 7A illustrates a single stage 410 of a pipeline that utilizes a search window 400 for reference data from a reference frame stored in a memory 420, according to at least some embodiments. A block i currently being processed at stage 410 may be processed according to reference data that is currently stored in search window 400. Assuming block i is on the top row of a row group, a prefetch request may be initiated to prefetch a next column of reference data for block i+r. Blocks i, i+1, i+2, and i+3 are processed at stage 410 according to reference data that is currently in search window 400. This gives r pipeline cycles to prefetch the next column of reference data for block i+r from memory 420. Assuming block i is on the top row of a row group, a prefetch to get a next column of reference data for block i may have been initiated for block i−r, and thus r pipeline cycles before block i is at stage 410.

Figure 7B:
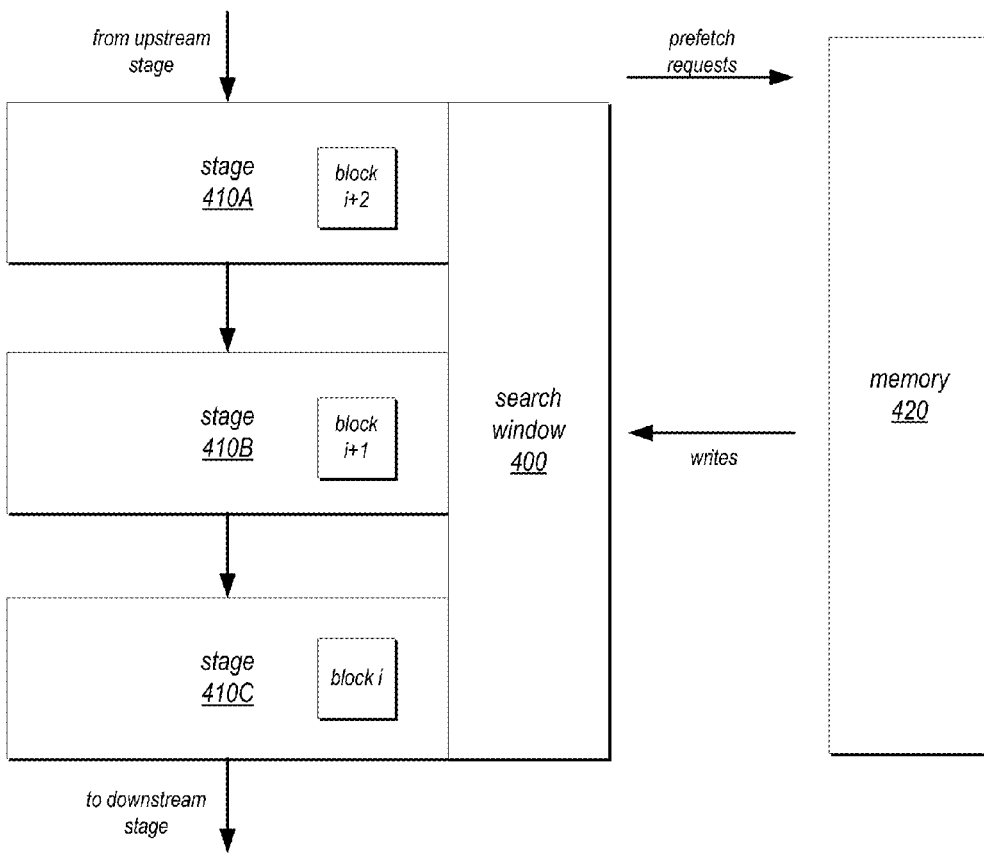
FIG. 7B illustrates multiple stages of a pipeline that utilize a search window for reference data from a reference frame stored in a memory, according to at least some embodiments.

FIG. 7B illustrates multiple stages 410 of a pipeline that utilize a search window 400 for reference data from a reference frame stored in a memory 420, according to at least some embodiments. The blocks currently being processed at stages 410A through 410C (blocks i, i+1, and i+2 in this example) may be processed according to reference data that is currently stored in search window 400. Assuming r=4, block i+3 will also be processed according to the reference data currently stored in search window 400. The search regions for the blocks at stages 410A through 410C are overlapped in the search window 400, for example as shown in FIG. 4. Assuming block i is on the top row of a row group, a prefetch request to prefetch a next column of reference data for block i+r may have been initiated at, before, or after block i input to stage 410A.

Figure 7C:
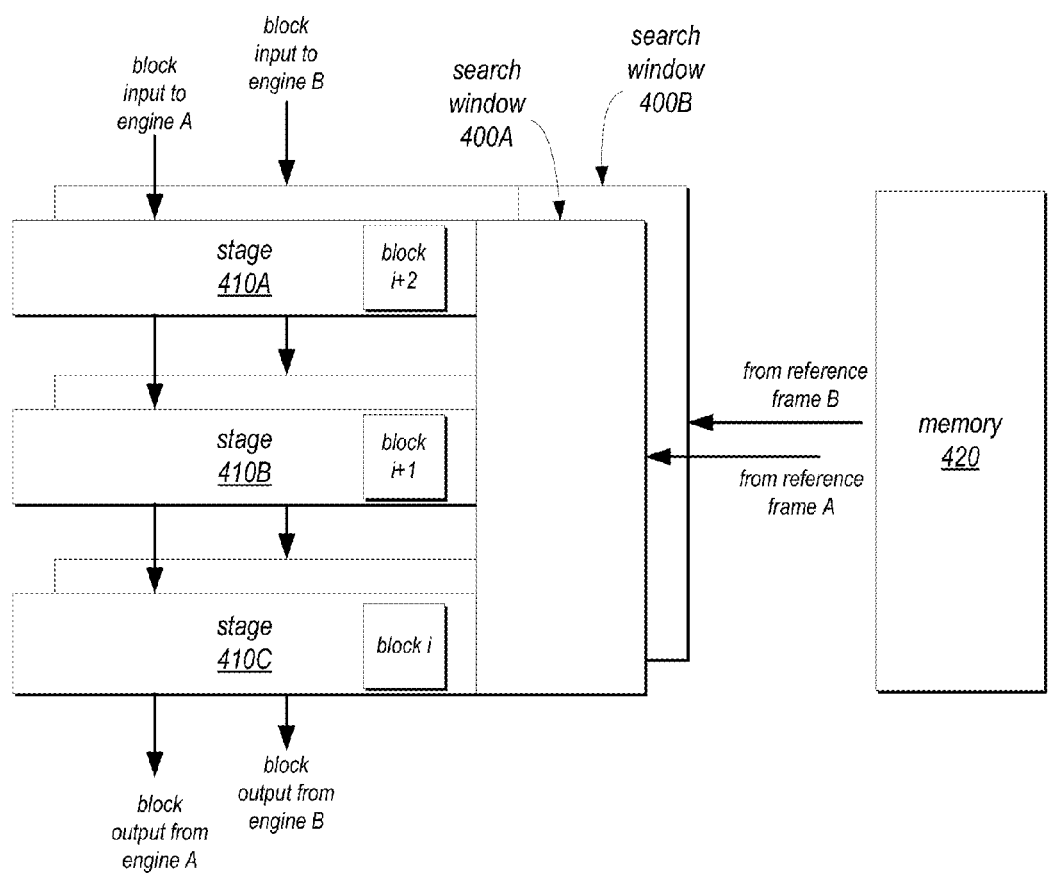
FIG. 7C illustrates a pipeline that includes multiple engines that each implement one or more stages of a pipeline, with a separate search window for each engine, according to at least some embodiments.

In some pipeline implementations, each block may be processed using reference data from two or more reference frames. FIG. 7C illustrates a pipeline that includes multiple engines that each implement the same one or more stages of a pipeline (in this example, stages 410A, 410B, and 410C), with a separate search window for each engine, according to at least some embodiments. Each engine performs one or more operations on each block according to a respective reference frame. In this example, there are two engines A and B that process blocks according to reference data from reference frames A and B, respectively. Each block is input to both engines. The pipeline may implement a separate search window 400A and 400B for engines A and B. Reference data from reference frame A may be prefetched into search window 400A, and reference data from reference frame B may be prefetched into search window 400B.

In some implementations, embodiments of a single search window as described herein may be shared by multiple hardware or software pipelines. FIGS. 8 and 9 show examples of sharing a search window among pipelines.

FIG. 8 shows an example implementation in which two block processing pipelines 510 are used to process adjacent row groups from an input frame in parallel, sharing a same search window, according to at least some embodiments. Blocks from adjacent row groups may, for example, be input to each of two pipelines 510A and 510B according to knight's order as described in the section titled Knight's order processing. As can be seen in FIGS. 4, 5A, and 5B, search regions for blocks in adjacent row groups may overlap. By expanding the search window 500 (e.g., by r rows), a single search window 500 may be used to locally store the search regions from a reference frame that are needed for processing blocks from both row groups and thus may be shared by both pipelines 510. For example, the search window 200 shown in FIG. 4 may be expanded to include 20 rows instead of 16 rows as shown. Block processing in the pipelines 510A and 510B may be synchronized to coordinate the advancing of the search window 500.

FIG. 9 shows an example implementation in which multiple pipelines are used to process adjacent rows from an input frame in parallel, sharing a same search window, according to at least some embodiments. In this example, four pipelines 610A through 610D are used to process four adjacent rows of blocks from an input frame in parallel. Each pipeline 610 may process a respective row in scan order. Block input to the pipelines 610 may be staggered. For example, pipeline 610A may be processing a first row and may be one block ahead of pipeline 610B, pipeline 610B may be processing a second row and may be one block ahead of pipeline 610C, and pipeline 610C may be processing a third row and may be one block ahead of pipeline 610D, which is processing a fourth row. The four pipelines 610 may share a common search window 600 similar to search window 200 shown in FIG. 4. In the example shown in FIG. 9, a prefetch of a next column of reference data from memory 620 may be initiated once every four blocks to advance the search window 600.

Example Search Window Application

In at least some video encoders, blocks of pixels from an input video frame may be encoded using blocks of pixels from one or more previously encoded frames (referred to as reference frames). The process of finding matching pixel blocks in reference frames may be referred to as inter-frame estimation, or more generally as motion estimation. Motion estimation operations may be subdivided into two or more sub-operations that may be performed at one, two, or more stages of a block processing pipeline, with one or more components or pipeline units at each stage configured to perform a particular sub-operation.

In an example embodiment, a block processing pipeline may include one instance of a motion estimation engine for each reference frame to be searched. Each motion estimation engine searches only one reference frame. In an example embodiment, each motion estimation engine may include a low resolution motion estimation component, a full pixel motion estimation component, and a subpixel motion estimation component. In an example embodiment, the three components of each of the motion estimation engines may be implemented at different stages of the pipeline. In at least some embodiments, the low resolution motion estimation component of each motion estimation engine performs an exhaustive search on a scaled-down, low resolution version of a respective reference frame to generate candidates. The full pixel motion estimation component performs a search on full size pixels using candidates from the low resolution motion estimation component. The subpixel motion estimation component performs a search on half and quarter pixels using best candidates received from the full pixel motion estimation component.

The example pipeline implementation shown in FIG. 7C may be used to implement motion estimation in a video encoder block processing pipeline as described above. Referring to FIG. 7C, each engine may be a motion estimation engine. Note that there may be more than two motion estimation engines in some implementations. In each motion estimation engine, stage 410A may implement the low resolution motion estimation component, stage 410B may implement the full pixel motion estimation component, and stage 410C may implement the subpixel motion estimation component. Each motion estimation engine may include or be coupled to a search window 400 component (e.g., SRAM (static random access memory)) as described herein to locally store corresponding reference frame data. Note that all three stages 410 of a given motion estimation engine may access the reference frame data from the corresponding search window 400 component. In at least some embodiments, a separate reference data cache 730 as illustrated in FIG. 10 may be associated with each search window 400 component and used to cache reference data from the corresponding reference frame as described below.

Reference Data Cache

At least some embodiments may cache a portion of a reference frame to a cache memory to reduce accesses to an external memory to fetch reference data for the search window. FIG. 10 illustrates using a cache memory to cache a portion of a reference frame, according to at least some embodiments. A reference frame 742 may be stored in an external memory 740, for example a memory that is external to the block processing pipeline 710 or to an apparatus such as a video encoder that implements the pipeline. For example, referring to FIG. 28, the reference frame 742 may be stored in a memory external to video encoder 7000 that implements block processing pipeline 7040. As another example, referring to FIG. 29, the reference frame may be stored in memory 8800 external to a system-on-a-chip (SOC) 8000 that implements a video encoder 7000 that includes the block processing pipeline.

Reference data cache 730 may be implemented in a memory that is local to the pipeline 710, for example a memory of the apparatus that implements the pipeline 710. Note that the local memory in which reference data cache 730 is implemented may be used in or by other pipeline functions. Thus, reference data cache 730, may be a portion of a shared memory. In at least some embodiments, width of the reference data cache 730 is at least the frame width. In at least some embodiments, height of the reference data cache 730 is sufficient to store at least the height of the search window in rows of blocks, plus r–1 rows to account for the rows in the row group.

Figure 11:
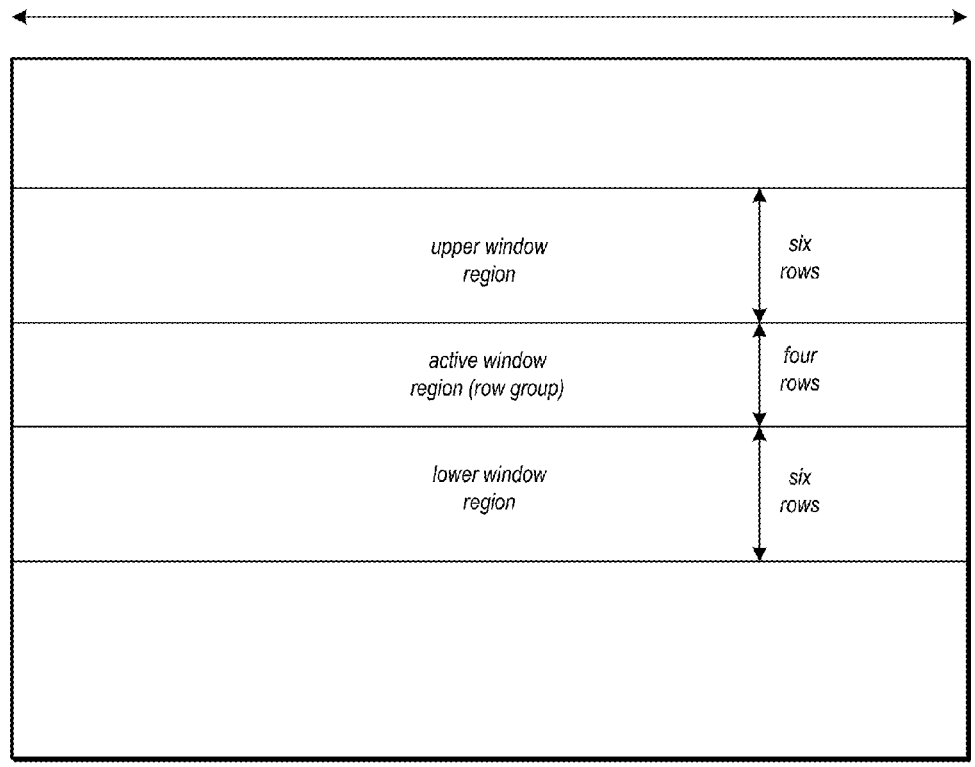
FIG. 11 graphically illustrates an example reference data cache according to at least some embodiments.

FIG. 11 graphically illustrates an example reference data cache 730 according to at least some embodiments. FIG. 11 assumes that the input frame is processed in the pipeline according to row groups of four rows, and that the height of the search region in the reference frame is 13 blocks. However, other numbers of rows in a row group may be used, and other dimensions for the search region may be used. The active window region corresponds to a row group of four rows. Cache 730 may be at least the width of a reference frame. Overall height of the reference data cache 730 may be at least 13+(4−1)=16 rows. The upper window region and the lower window region each extend 6 blocks from the active window region. The search region around a block on the top row of the row group would extend to the top row of the upper window region and to two rows above the bottom row of the lower window region. Similarly, the search region around a block on the bottom row of the row group would extend from two rows from the top of the upper window region to the bottom row of the lower window region. An active region 204 of the search window as shown in FIG. 4 would begin at the left of the reference data cache 730 and move one column to the right every fourth block processed in the pipeline. Each time the active region 204 is to advance one column, a prefetch request is issued and reference data that is present in cache 730 may be used to at least partially fulfill the request, with the remainder (cache misses) fetched from external memory.

Referring again to FIG. 10, in at least some embodiments, reference data cache 730 may be initialized for an input frame by fetching a first portion of the reference frame 742 from external memory 740 and storing the fetched reference data to the cache 730. For example, in some embodiments, one row group, two row groups, two and a half row groups, or more row groups of frame width may be fetched from the reference frame 742 in external memory 740 and cached in reference data cache 730. However, instead of fetching entire rows, the fetched rows of reference data may extend only partially across the frame in some embodiments. For example, in some embodiments, the reference data initially fetched from external memory 740 and cached in reference data cache 730 may correspond to the initial search window as shown in FIG. 5A. In at least some embodiments, the search window may be initialized (see, e.g., FIG. 5A) from the reference data in cache 730. However, in some embodiments, reference data that is not in the cache 730 at initialization of the search window may be fetched from external memory 740 and written to the cache 730 as well as to the search window.

Referring again to FIG. 10, in at least some embodiments, when pipeline 710 generates a prefetch request to read a next column of blocks into search window 700, a cache control 720 component receives the request and determines which blocks specified by the request are cached in reference data cache 730 and which are not (cache misses). Any blocks that are cached are retrieved from cache 730, and any blocks that are not cached are fetched from external memory 740. The column of blocks specified by the prefetch is written to search window 700; the blocks that were fetched from external memory 740 are also cached to reference data cache 730.

In at least some embodiments, after initialization of the reference data cache 730, each subsequent prefetch request for a new column of reference data may be satisfied at least in part from the cache 730. In some cases, for example when processing blocks in the first row group of the input frame, the entire column of blocks may already be in the cache 730 if the cache 730 initialization fetched data across the entire width of the frame and with a sufficient number of rows to include all the blocks needed in a requested column (in other words, enough blocks to fill the search region for the first row group, for example as shown in FIG. 5A). For subsequent row groups (see, e.g. FIG. 5B), the search region shifts down by r rows for each row group (the number of rows in a row group). For each prefetch request to fetch reference data for a block in the subsequent row group, typically only the r blocks at the bottom of the column will need to be fetched from the external memory 740, as the other blocks at the top of the column should already be in the cache 730, since the search region for the previous row group overlaps the search region for the current row group.

FIG. 10 shows a single search window 700 and single reference data cache 730. In implementations in which multiple search windows are used (see, e.g., FIG. 7C), each search window 700 may have a corresponding, separate reference data cache 730. Note, however, that the reference data caches 730 may be, but are not necessarily, implemented in a same memory.

Figure 12A:
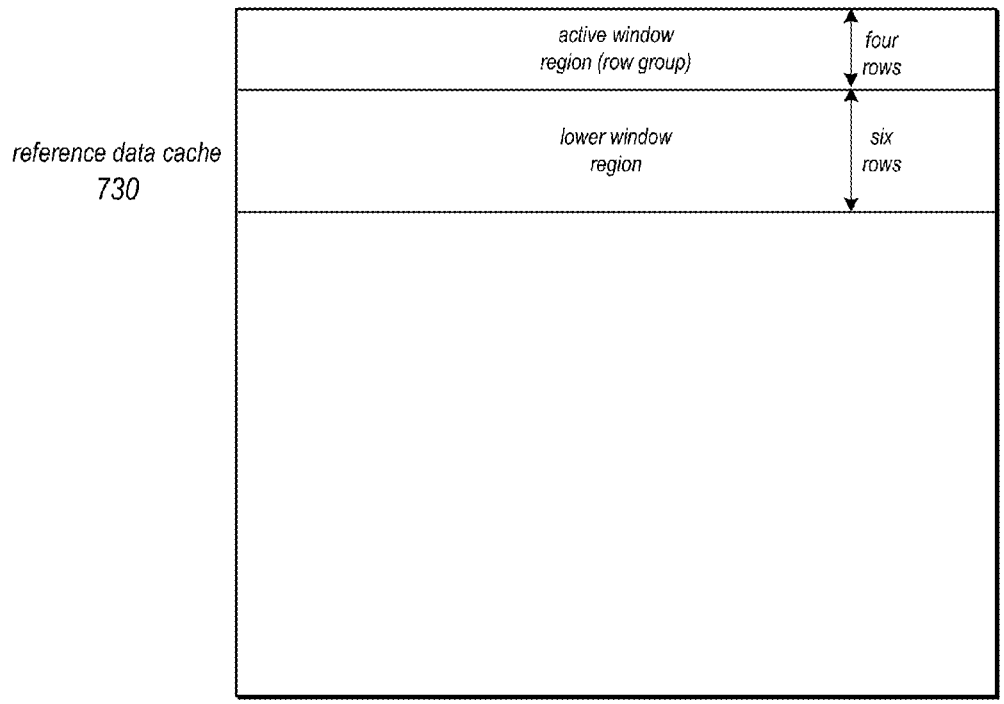
FIGS. 12A through 12C graphically illustrate operations of the reference data cache for the first three row groups in an input frame, according to at least some embodiments.
Figure 12B:
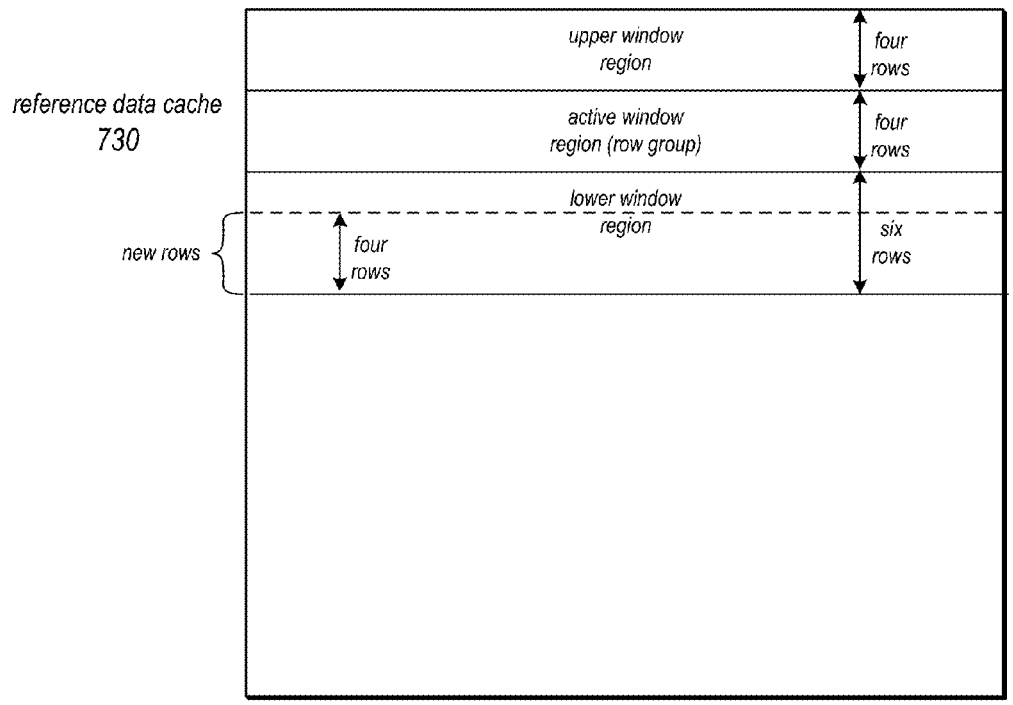
Figure 12C:
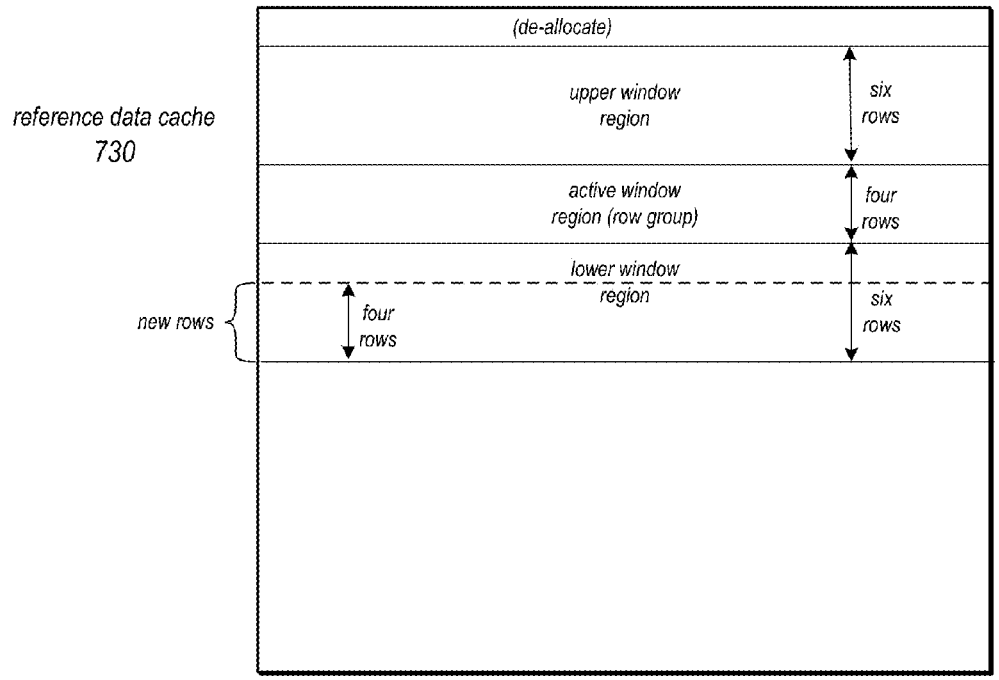

FIGS. 12A through 12C graphically illustrate operations of the reference data cache for the first three row groups in an input frame, according to at least some embodiments. These Figures assume that the input frame is processed in the pipeline according to row groups of four rows, and that the height of the search region in the reference frame is 13 blocks. However, other numbers of rows in a row group may be used, and other dimensions for the search region may be used.

In FIG. 12A, the reference data cache 730 may have been initialized by fetching the first ten rows from the reference frame in an external memory and storing the data in cache 730. The first ten rows cover the active window region (the row group) plus the lower window region. After the search window is initialized, reference data for first row group blocks can be prefetched into the search window from the data in cache 730 one column of 10 blocks at a time, with a prefetch initiated once every four blocks (e.g., at top row blocks). However, in some embodiments, the entire width and/or height of data as shown in FIG. 12A may not be fetched from the external memory when initializing cache 730, and thus at least some reference data may be fetched from the external memory to satisfy prefetch requests; the fetched data may be stored in the cache 730 as well as used to satisfy the prefetch requests.

In FIG. 12B, the pipeline has begun processing blocks from the second row group. The search window in the reference frame shifts down by the number of rows in a row group (in this example, four rows). The active window region in cache 730 corresponds to the second row group. The region of the cache 730 above the dashed line includes reference data that was previously cached when processing the first row group. The search region for the second row group overlaps this region. However, the region of four rows of reference data in the second row group's search region shown below the dashed line in cache 730 may not have been fetched from the external memory and stored in the cache 730. In at least some embodiments, when the pipeline begins to issue prefetch requests for columns of reference data for blocks in the second row group, the portion of each column above the dashed line (ten rows, and thus ten blocks) may be read from the cache 730, while the portion of each column below the dashed line (four rows, and thus four blocks) may be fetched from the external memory. The fetched reference data may be cached to cache 730 as well as used to satisfy the prefetch requests for the search window. In some embodiments, as an alternative, a portion or all of the four rows below the dashed line in FIG. 12B may be fetched from the external memory and stored in cache 730 when blocks in the second row group begin to be processed.

In FIG. 12C, the pipeline has begun processing blocks from the third row group. The search window in the reference frame again shifts down by the number of rows in a row group (in this example, four rows). The active window region in cache 730 now corresponds to the third row group. The region of the cache 730 above the dashed line includes reference data that was previously cached when processing the first and second row groups. The search region for the third row group overlaps this region. However, the region of four rows of reference data in the second row group's search region shown below the dashed line in cache 730 may not have been fetched from the external memory and stored in the cache 730. In at least some embodiments, when the pipeline begins to issue prefetch requests for columns of reference data for blocks in the third row group, the portion of each column above the dashed line (twelve rows, and thus twelve blocks) may be read from the cache 730, while the portion of each column below the dashed line (four rows, and thus four blocks) may be fetched from the external memory. The fetched reference data may be cached to cache 730 as well as used to satisfy the prefetch requests for the search window.

In FIG. 12C, the search window has shifted down so that now the top two rows of the cache 730 includes reference data that will no longer be used. In at least some embodiments, when the pipeline begins to issue prefetch requests for columns of reference data for blocks in the third row group, in addition to caching a newly fetched portion of a column of reference data to cache 730, may also mark an oldest column of reference data above the search window to be de-allocated so that the memory location can be re-used.

The method may continue as described above for additional row groups in the input frame until the entire frame is processed, generating prefetches of columns of reference data into the search window which may be satisfied in part from reference data already in cache 730 and in part from data fetched from external memory. Note, however, that on at least the last row group in the input frame, all necessary reference data may already be in cache 730, so reference data may not need to be fetched from the external memory.

Figure 13:
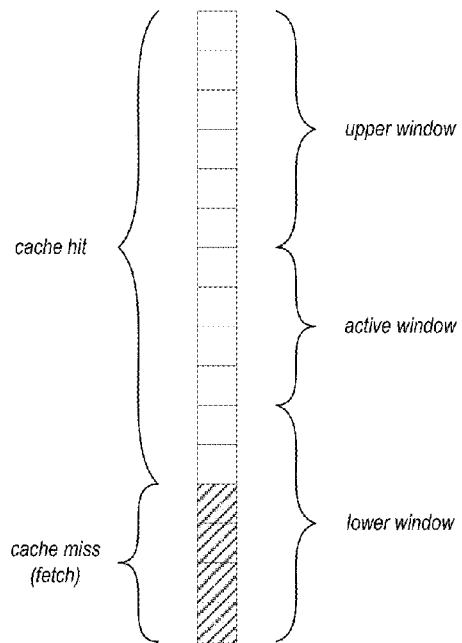
FIG. 13 illustrates an example column of blocks that may be prefetched into the search window, according to at least some embodiments.

FIG. 13 illustrates an example column of blocks that may be prefetched into the search window, according to at least some embodiments. For at least some of the row groups in the input frame, since the search window for the row group overlaps the search window for the previous row group(s), the top n (in this example, 12) blocks may already be cached, and thus these blocks may be read from the cache 730 to satisfy the prefetch request. The other r (in this example, 4) blocks may be fetched from an external memory and used to satisfy the remainder of the search request. The fetched blocks may also be stored to the cache 730 so that the data is available in cache 730 to satisfy future prefetch requests.

Figure 14:
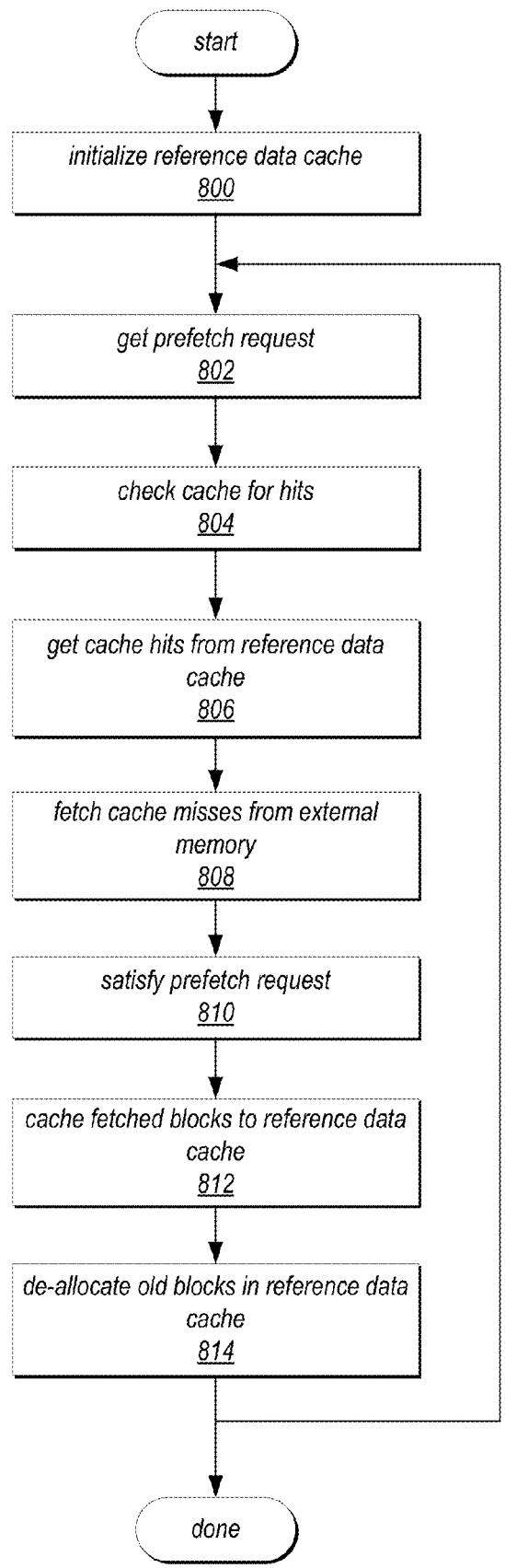
FIG. 14 is a flowchart of a method for caching reference frame data, according to at least some embodiments.

FIG. 14 is a flowchart of a method for caching reference frame data, according to at least some embodiments. As indicated at 800, the reference data cache may be initialized. For example, in some embodiments, multiple rows of reference data may be read from an external memory and stored to the reference data cache to initialize the cache for a first row group of an input frame to be processed in the pipeline. As indicated at 802, a prefetch request for a next column of data in the search window may be generated by the pipeline. As indicated at 804, the reference data cache may be checked for hits on the prefetch request. As indicated at 806, the cache hits, if any, are retrieved from the reference data cache. As indicated at 808, cache misses, if any, are fetched from an external memory. As indicated at 810, the prefetch request is satisfied using the data retrieved from the cache and/or the data fetched from the external memory. As indicated at 812, if reference data was fetched from the external memory, the new data may be written to the reference data cache. As indicated at 814, one or more oldest blocks in the reference data cache may be marked as de-allocated. As indicated by the arrow returning to element 802, the method may continue to receive and process prefetch requests until the pipeline has completed processing of the input image.

Memory Latency Tolerance in Block Processing Pipelines

The above describes embodiments of block processing pipeline methods and apparatus in which pixel data from a reference frame is prefetched into a local memory (referred to as a search window memory) for access by one or more stages of a pipeline. The search window may be advanced by one column of blocks by initiating a prefetch for a next column of reference data from memory that stores the reference frame prior to the pipeline advancing to a first block for which the reference data in the column is needed. Since the blocks are being processed by row groups, a prefetch may be initiated once per the number of rows in a row group. This provides latency for performing the prefetch, for example at least four pipeline cycles in implementations where there are four rows per row group.

However, the memory system from which the reference data is prefetched may be shared by other processes, including other processes of the pipeline and other processes external to the pipeline. There may be periods when the memory system is busy handling requests from multiple processes, and thus takes longer to satisfy the prefetch requests. Thus, there may be occasions in which reference data requested by one or more prefetch requests arrives late. If this occurs, one or more blocks or columns of reference data needed to process a particular block may not be in the search window when the block arrives at a stage of the pipeline that processes blocks according to the reference data in the search window. The stage may have to wait for reference data to arrive, which stalls the pipeline. Stalling the pipeline impacts block throughput, which impacts performance of the video encoder or other apparatus that implements the pipeline. In pipeline applications such as video encoding, maintaining a relatively constant overall level of performance may be an important goal.

Embodiments of memory latency tolerance methods are described that may help maintain an overall level of performance in block processing pipelines at times when the memory system is causing delays in delivery of prefetched reference frame data. These memory latency tolerance methods may include, but are not limited to, one or more methods in which stage(s) do not stall the pipeline when reference data is missing for a block and one or more methods in which stage(s) are allowed to stall the pipeline, but steps are taken after a stall so that the pipeline can catch up. The former may be referred to as no stall methods, and the second may be referred to as stall recovery methods.

In the methods in which stage(s) do not stall the pipeline when reference data is missing for a block, the block may be processed at one or more stages without using at least the missing reference data. In other words, instead of waiting for the missing reference data, the block is processed using reference data that is present in the search window when the block arrives at the stage. In the methods in which stage(s) are allowed to stall the pipeline, block processing at one or more stages of the pipeline may be modified for at least some future blocks to speed up the pipeline processing and thus allow the pipeline to catch up in throughput to maintain the desired overall level of performance.

In addition to the above, the memory latency tolerance methods may also include one or more methods in which pipeline processing is proactively adjusted upon detecting that the memory system may be running behind, and thus in advance of the pipeline encountering a stall condition. These methods may be referred to as stall prevention methods.

Note that a block processing pipeline may implement one, two, or more of the memory latency tolerance methods as described herein. For example, a block processing pipeline may implement a method that proactively adjusts pipeline processing in advance of the pipeline encountering a stall condition, and also implement one or more of the other methods if a stall condition is encountered that either do not allow the stage(s) to stall or that recover after a stall.

Figure 15:
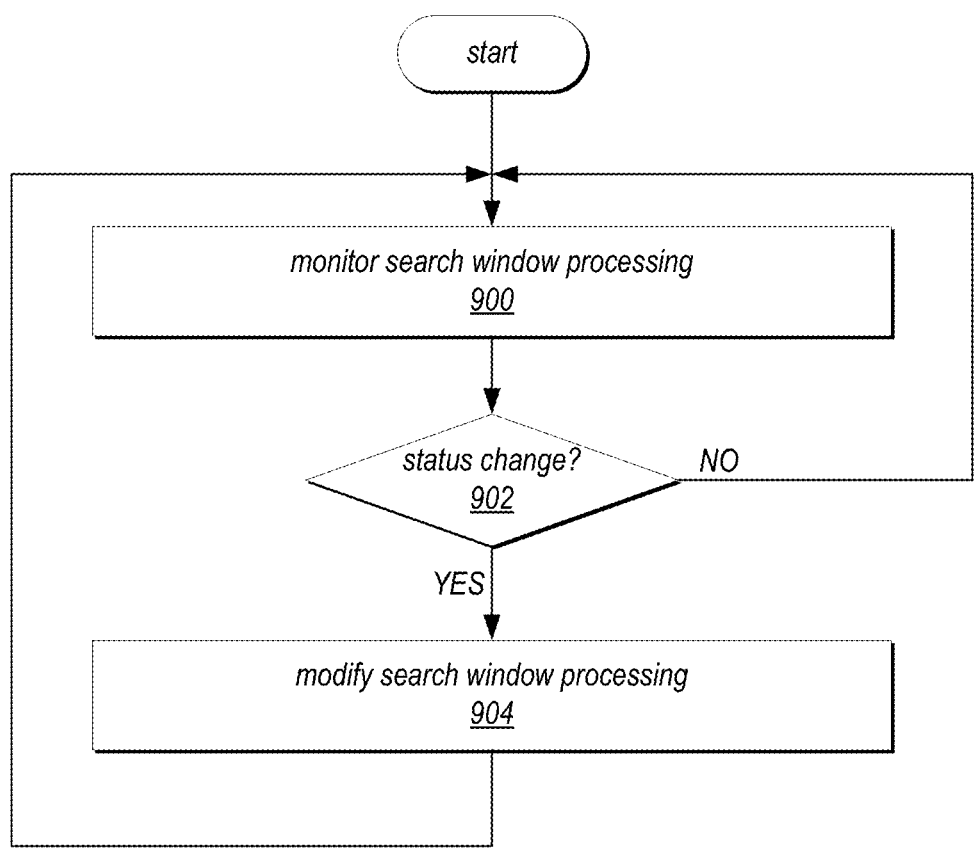
FIG. 15 is a high-level flowchart of a general memory latency tolerance method, according to at least some embodiments.

FIG. 15 is a high-level flowchart of a general memory latency tolerance method, according to at least some embodiments. As indicated at 900, search window processing in the pipeline may be monitored. Monitoring search window processing may include, but is not limited to, monitoring content of the search window, monitoring operations of one or more stages of the pipeline, and/or monitoring performance of the memory system. As indicated at 902, if status of one or more of the elements being monitored changes in a way that may affect pipeline throughput, then search window processing may be modified according to the change. The modification may be performed according to one or more of the memory latency tolerance methods described herein to proactively adjusts pipeline processing in advance of the pipeline encountering a stall condition, not allow the stage(s) to stall, or recover after a stall. Note that if monitoring detects that status has changed for the better, the pipeline may be returned to normal search window processing.

No Stall Methods

Figure 16:
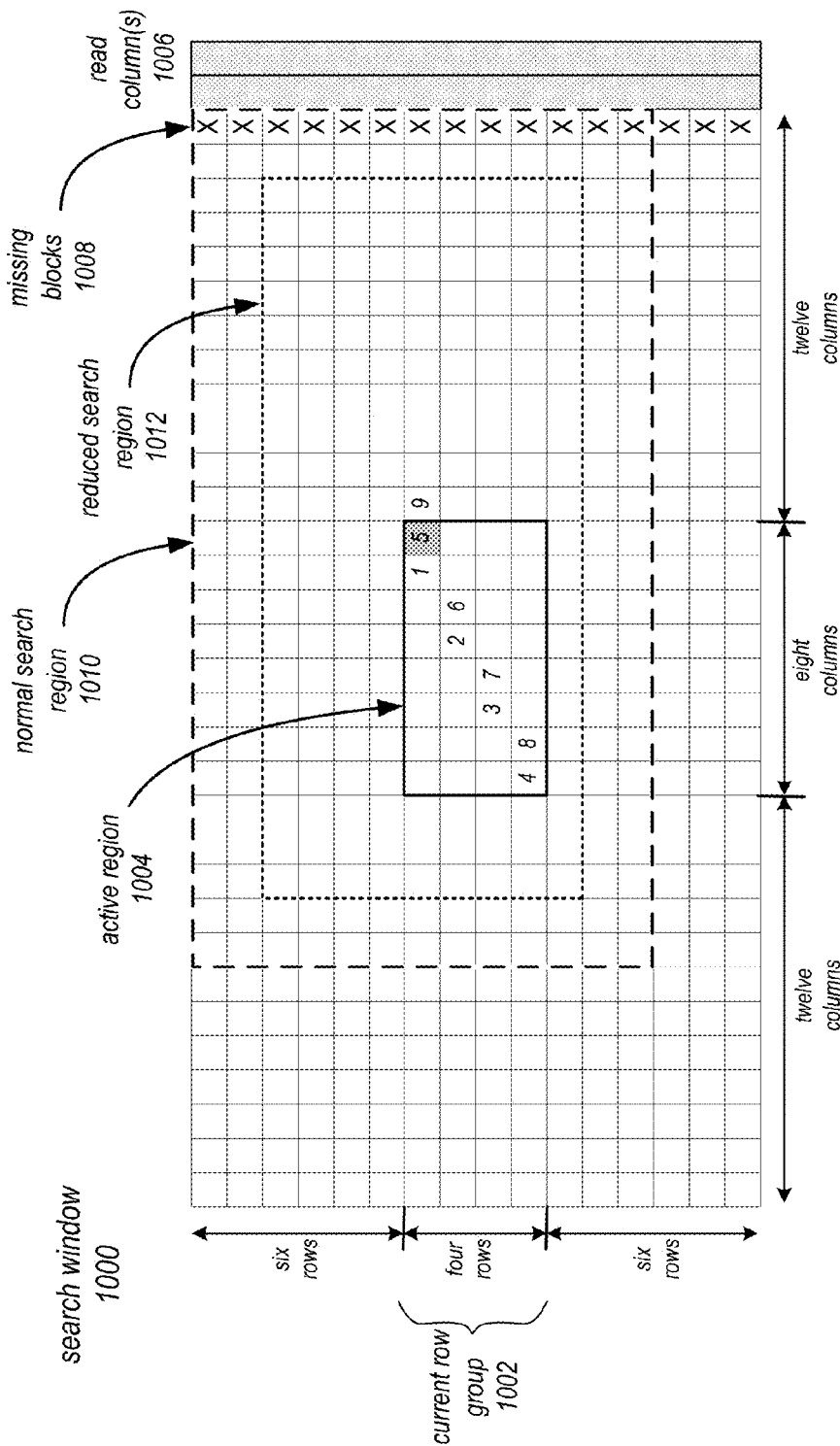
FIG. 16 graphically illustrates no stall methods, according to at least some embodiments.
Figure 17:
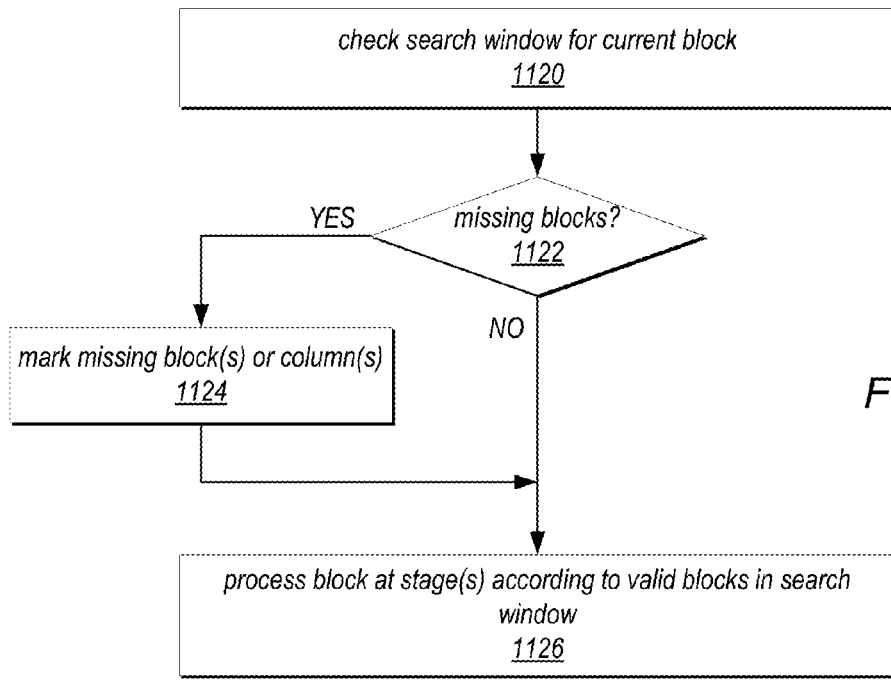
FIG. 17 is a flowchart of a no stall method in which missing blocks in the search window are flagged so that the stage(s) can process the block using only valid (unmarked) blocks from the search window, according to at least some embodiments.
Figure 18:
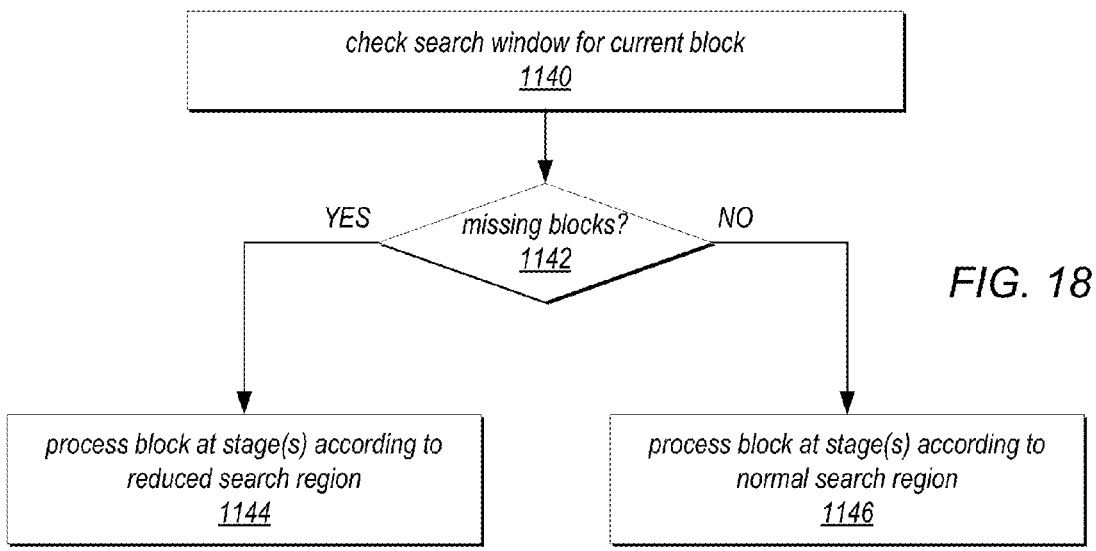
FIG. 18 is a flowchart of a no stall method in which the search region is reduced so that the stage(s) can process the block using the smaller search window, according to at least some embodiments.

FIGS. 16 through 18 illustrate no stall methods, according to at least some embodiments. "No stall" methods are memory latency tolerance methods in which stage(s) do not stall the pipeline when reference data is missing for a block.

In no stall methods, block may be processed at one or more stages using reference data that is available in the search window and without using at least the missing reference data. Block operations that use the reference data in processing a block may generally require a search region of specified dimensions. However, many of these operations may be performed on the reference data that is present, for example by reducing the size of the search region to exclude areas where one or more blocks are missing. Thus, instead of waiting for missing reference data, the operation(s) may be performed using the data that is available in the search window when the respective block has arrived at the stage and is otherwise ready to be processed.

FIG. 16 graphically illustrates no stall methods, according to at least some embodiments. FIG. 16 shows an example search window 1000, and assumes that a block processing method is used in which rows are processed in groups of four rows as shown by row group 1002. In addition, FIG. 16 assumes that the normal search region for a given block is a 25×13 rectangle. Active region 1004 of search window 1000 includes all blocks in the current frame for which reference data should be available in search window 1000. In this example, the active region 1004 is eight columns wide and four rows high. To encompass the normal search regions for all of the blocks in active region 1004, the search window 1000 in this example is at least 32 columns wide by 16 rows high. The search window 1000 may also include one or more read columns 1006 for prefetching columns of blocks from the reference frame, for example for the block labeled 9 to the right of the block labeled 5.

Block 5 represents a block that has reached a stage of the pipeline at which reference data in the search window 1000 is accessed to process the block. The normal search region 1010 for block 5 is shown by the dashed rectangle. A prefetch for a column of blocks of search window height (16 rows high) and that includes the rightmost column of the normal search region 1010 for block 5 (13 rows high) was initiated prior to block 5 arriving at the stage, for example when the block labeled 1 was at the stage four pipeline cycles previously. (A prefetch request for a next column of blocks that includes the rightmost column of the normal search region for block 9 may be issued when block 5 is at the stage.) However, in this example, the prefetch for the column of blocks that includes the rightmost column of the normal search region 1010 for block 5 has not been completed, and thus the reference data from the reference frame for the rightmost column of search region 1010 is not yet available in search window 1000.

In at least some embodiments, any missing blocks in the search window may be marked as missing and thus invalid, as shown by the blocks marked "X" in FIG. 16. For example, metadata for the search window 1000 may include a data structure that includes a validity field or flag for each block in search window 1000 that can be set for each block to indicate if the block is valid (present) or invalid (missing). Instead or in addition, the entire column may be marked as invalid. For example, metadata for the search window 1000 may include a data structure that includes a validity field or flag for each column in search window 1000 that can be set for each column to indicate if the column is valid (present) or invalid (missing). In some embodiments, the validity flag for a column may be set to invalid if any blocks in the column are missing, even if some blocks are present. Alternatively, the validity flag for a column may be set to invalid only if all of the blocks in the column are missing. Note that the validity flag for a block and/or column may later be reset to present (valid) when the block and/or column has been successfully prefetched into the search window 1000.

In a first no stall method, the stage(s) of the pipeline that process block 5 according to reference frame data in search window 1000 may proceed with processing block 5 using the normal search region 1010, but only using the valid blocks in the normal search region 1010 to process the block. In other words, the stage(s) process the block normally and without waiting for any missing blocks to be prefetched into search region 1010, but ignore any blocks or columns that are marked as invalid in the search region 1010 when processing the block. Thus, the stage(s) do not stall.

In a second no stall method, the stage(s) of the pipeline that process block 5 according to reference frame data in search window 1000, upon detecting missing or invalid blocks in search region 1010 for block 5, proceed with processing block 5 using a reduced search region 1012 as shown by the dashed rectangle in FIG. 16. The reduced search region 1012 in this example is shown to have been reduced from the normal size by four rows overall in the vertical dimension and four columns overall in the horizontal dimension, making the reduced search region size 9 rows high and 19 columns wide, instead of the normal search region size of 13 rows high and 23 rows high. However, the search region may be reduced by more or fewer columns in the vertical dimension and/or more or fewer columns in the horizontal dimension. In addition, in some implementations, the search region may be reduced in only the horizontal dimension.

FIGS. 17 and 18 are high-level flowcharts of no stall methods, according to at least some embodiments. The methods of FIGS. 17 and 18 may, for example, be used in processing a block at element 310 of the method for prefetching reference data into a search window when processing an input frame in a block processing pipeline as illustrated in FIG. 6.

FIG. 17 is a flowchart of a no stall method in which missing blocks in the search window are flagged or marked so that the stage(s) can process the block using only valid (unmarked) blocks from the search window, according to at least some embodiments. As indicated at 1120, a check of the search window may be performed for a current block at a stage. The stage may, for example, be a first stage of the pipeline that processes the block according to reference data in the search window. In at least some embodiments, the check is only performed at or for a first stage of the pipeline that processes the block according to the search window. Alternatively, the check may be performed at each stage that processes the block according to the search window. The check may determine if any blocks that have been requested to be prefetched into the search window have not yet been written to the search window. In other words, the check determines if any blocks of reference data needed to process the current block at the stage(s) are missing from the search window.

At 1122, if the check determines that one or more blocks for which a prefetch request was issued are missing from the search window, then the missing block(s) and/or column(s) may be flagged or marked as missing as indicated at 1124. For example, metadata for the search window may include a data structure that includes a validity field or flag for each block in the search window that can be set for each block to indicate if the block is valid (present) or invalid (missing). Instead or in addition, the entire column may be marked as invalid. For example, metadata for the search window may include a data structure that includes a validity field or flag for each column in the search window that can be set for each column to indicate if the column is valid (present) or invalid (missing). In some embodiments, the validity flag for a column may be set to invalid if any blocks in the column are missing, even if some blocks are present. Alternatively, the validity flag for a column may be set to invalid only if all of the blocks in the column are missing. Note that the validity flag for a block and/or column may later be reset to present when the block has been successfully prefetched into the search window. At 1122, if the check determines that all blocks for which a prefetch request was issued are present in the search window, then all blocks are marked as valid, or alternatively no blocks are marked as missing.

As indicated at 1126, the current block may be processed at the stage(s) according to the valid blocks in the search window. In other words, the stage(s) process the block normally using the normal search region for the block and without waiting for any missing blocks to be prefetched into the search region, while ignoring any blocks or columns that are marked as invalid in the search region for this block when processing the block. Thus, the stage(s) do not stall.

FIG. 18 is a flowchart of a no stall method in which the search region is reduced so that the stage(s) can process the block using the smaller search window, according to at least some embodiments. As indicated at 1140, a check of the search window may be performed for a current block at a stage, for example as described for element 1120 of FIG. 17. At 1142, if the check determines that one or more blocks for which a prefetch request was issued are missing from the search window, then the block may be processed at one or more stage(s) according to a reduced search region as indicated at 1144. In at least some embodiments, the normal search region size for a block may be reduced by two, four, or more columns on the horizontal axis to thus exclude the missing blocks. For example, if the normal search region for a given block is a 25 column×13 row rectangle, the reduced search region may be a 23 column×13 row rectangle, or a 21 column×13 row rectangle. In some embodiments, the normal search region size may be also be reduced by two or more rows on the vertical axis. For example, if the normal search region for a given block is a 25 column×13 row rectangle, the reduced search region may be a 23 column×11 row rectangle. In at least some embodiments, missing blocks and/or columns may be marked as missing or invalid, for example as described above for element 1124 of FIG. 17. At 1142 of FIG. 18, if the check determines that all blocks for which a prefetch request was issued are present in the search window, then the block may be processed at one or more stage(s) according to the normal search region as indicated at 1146.

Stall Prevention Methods

Figure 19:
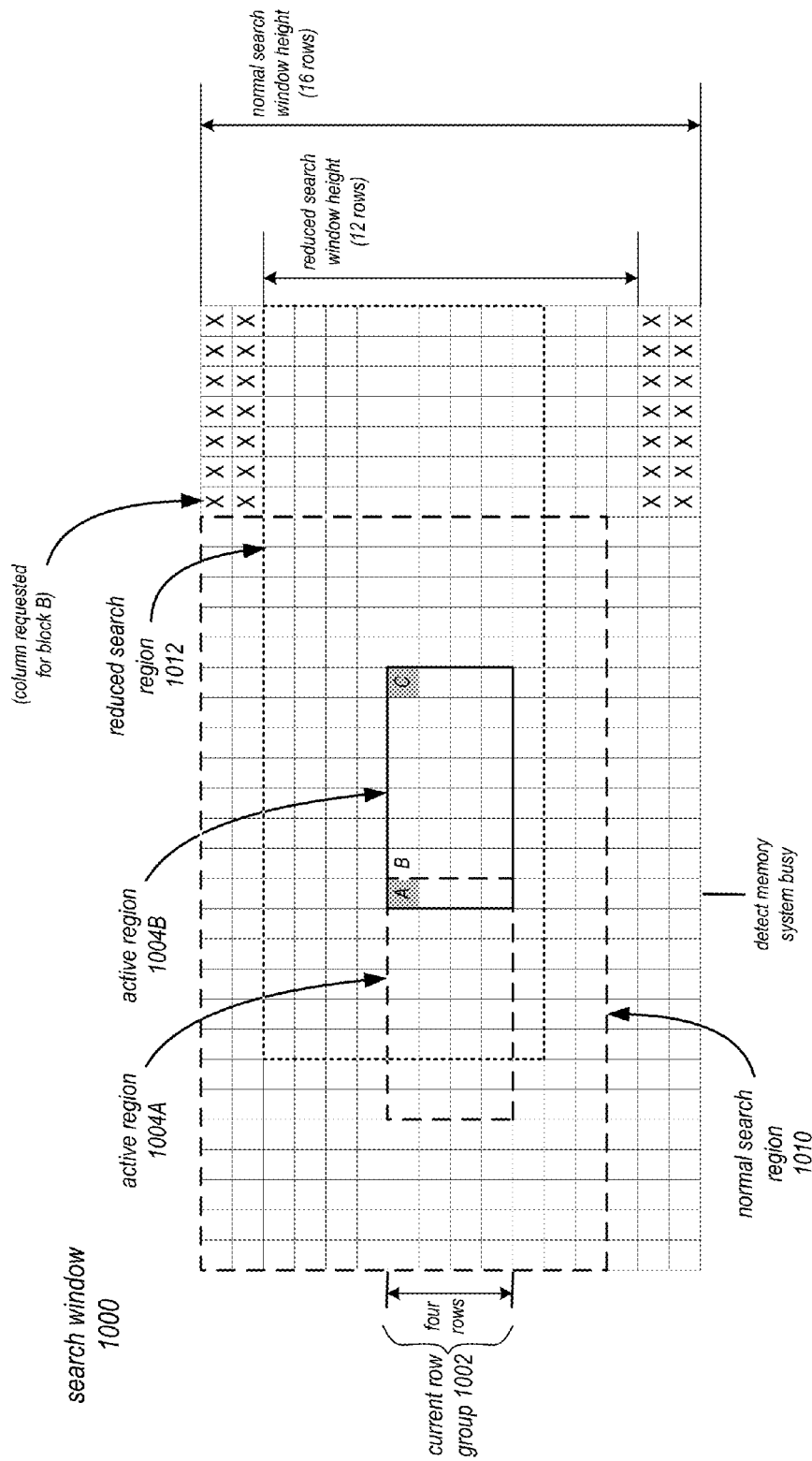
FIG. 19 graphically illustrates stall prevention methods, according to at least some embodiments.
Figure 20:
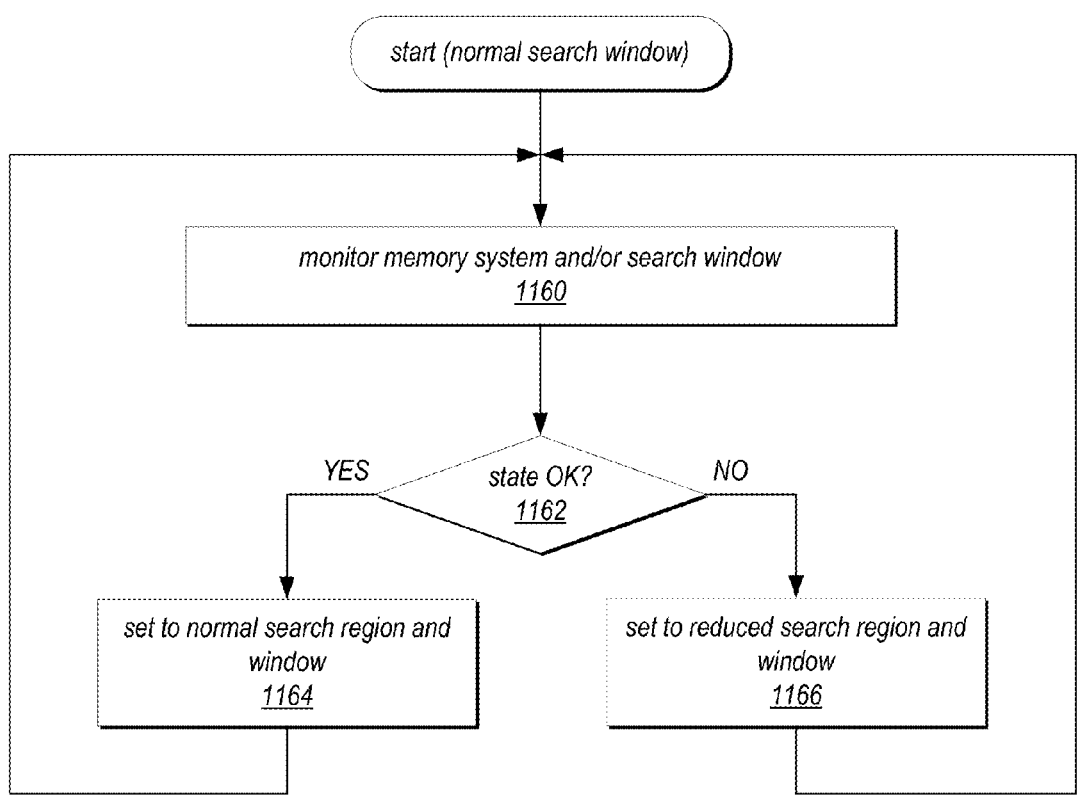
FIG. 20 is a flowchart of a stall prevention method in which the search region is reduced upon detecting a memory system condition, according to at least some embodiments.

FIGS. 19 and 20 illustrate stall prevention methods, according to at least some embodiments. Stall prevention methods are memory latency tolerance methods in which pipeline processing is proactively adjusted upon detecting that the memory system may be running behind, and thus in advance of the pipeline encountering a stall condition. For example, the search region used in processing blocks in the pipeline may be proactively reduced upon detecting a potential stall condition. Reducing the search region also reduces the height of the search window, which allows a reduction of the height of the columns that are requested for prefetching from the reference frame into the search window. Thus, fewer blocks are requested to be prefetched into the search window by the memory system, which may reduce the overall load on the memory system and thus help to prevent a stall condition from occurring. Note that the search region may be increased, for example back to normal size, upon detecting that the status of the memory system has improved.

FIG. 19 graphically illustrates stall prevention methods, according to at least some embodiments. FIG. 19 shows an example search window 1000, and assumes that a block processing method is used in which rows are processed in groups of four rows as shown by current row group 1002. In addition, FIG. 19 assumes that the normal search region for a given block is a 25×13 rectangle. An active region 1004 of search window 1000 includes all blocks in the current frame for which reference data should be available in search window 1000. In this example, the active region 1004 is eight columns wide and four rows high. To encompass the normal search regions for all of the blocks in the active region 1004, the search window 1000 in this example is at least 32 columns wide by 16 rows high. The search window 1000 may also include one or more read columns (not shown in FIG. 19) for prefetching columns of blocks from the reference frame.

In FIG. 19, the block marked A represents a block in row group 1002 that was previously processed by the pipeline, and the block marked C represents a block in row group 1002 that is currently being processed. Active region 1004A, shown by a solid rectangle, represents the active region when block A was processed, and active region 1004B, shown by the smaller dashed rectangle, represents the active region for block C. Normal search region 1010, shown by the larger dashed rectangle, corresponds to and was used for block A, and reduced search region 1012, shown by the dotted rectangle, corresponds to and is used for block C.

In this example, a potential stall condition was detected as block A was being processed in the pipeline. For example, a process may monitor one or more metrics of the search window and/or memory system to determine how long it is taking to satisfy prefetch requests. If this time goes over a specified threshold, the process may determine that there is a potential stall condition. In response, the process may direct one or more stages of the pipeline to use a reduced search window for subsequent blocks. In at least some embodiments, the search region is reduced by two or more rows on the vertical axis, but not reduced on the horizontal axis. For example, in FIG. 19, the normal search region is a 25 column×13 row rectangle, and the reduced search region is a 25 column×9 row rectangle. In some embodiments, the search region may instead or also be reduced by two or more columns on the horizontal axis.

A prefetch request for a column that would first be used when block B was processed was issued as block A was being processed. However, since the search region has been reduced to 25×9, the search window height has been reduced from 16 rows to 12 rows, and thus the prefetch requests for columns beginning at block B are 12 rows high rather than 16 rows high.

In at least some embodiments, any blocks that are not prefetched into the search window 1000 due to the reduced search region may be marked invalid in the search window 1000, as shown by the blocks marked "X" in FIG. 19. Note that the validity flag for a block may later be reset to valid when the block is prefetched into the search window 1000, for example when processing blocks in a subsequent row group.

FIG. 20 is a flowchart of a stall prevention method in which the search region is reduced upon detecting a memory system condition, according to at least some embodiments. The method of FIG. 20 may, for example, be used in the method for prefetching reference data into a search window as illustrated in FIG. 6. Initially when processing a frame in the pipeline, the search region and search window may be set to specified (normal) dimensions. As indicated at 1160, when processing blocks from the frame in the pipeline, the memory system and/or search window may be monitored for potential conditions that may cause the pipeline to stall when waiting for reference data to be prefetched from memory into the search window. At 1162, as long as the monitoring determines that the state of the memory system and/or search window is OK, then the pipeline is set to use the normal search region and search window. However, upon detecting a memory system condition that may cause a pipeline stall, the pipeline may be set to use a reduced search region when processing upcoming blocks, and thus also set to use a reduced search window for the upcoming blocks. The pipeline may be later reset to use the normal search region and search window upon detecting that the state of the memory system has returned to normal.

Stall Recovery Methods

Figure 21:
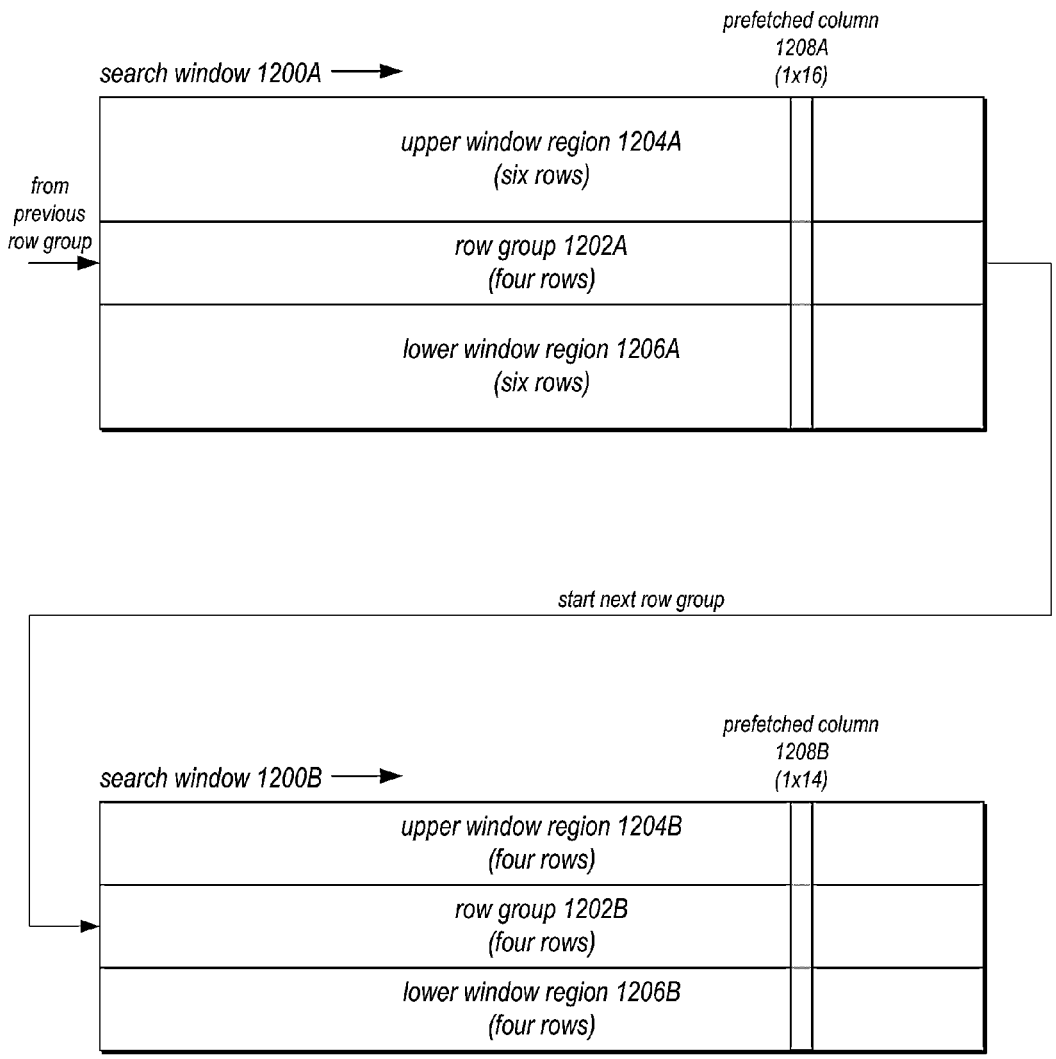
FIG. 21 graphically illustrates stall recovery methods, according to at least some embodiments.
Figure 22:
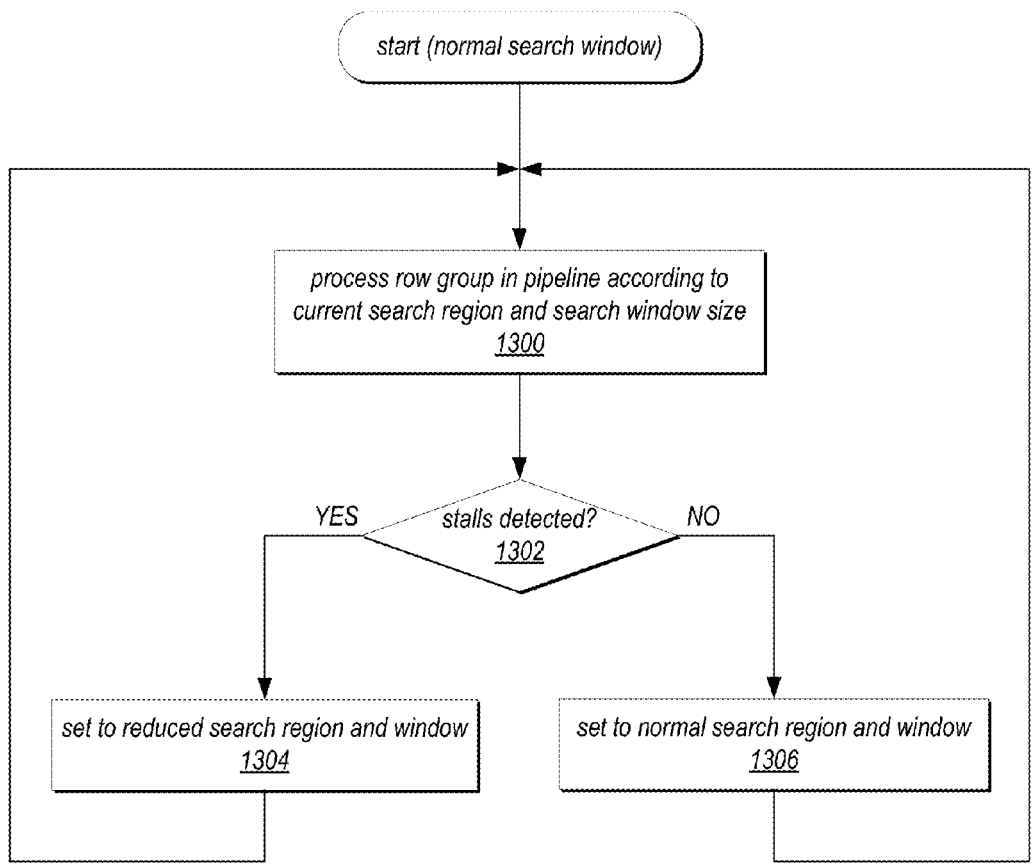
FIG. 22 is a flowchart of a stall recovery method in which the search region is reduced after a pipeline stall, according to at least some embodiments.

FIGS. 21 and 22 illustrate stall recovery methods, according to at least some embodiments. Stall recovery methods are memory latency tolerance methods in which stage(s) are allowed to stall the pipeline to wait for missing reference data, but steps are taken after a stall so that the pipeline can catch up. In at least some embodiments of stall recover methods, block processing at one or more stages of the pipeline may be modified for at least some future blocks to speed up the pipeline processing and thus allow the pipeline to catch up in throughput to maintain the desired overall level of performance.

FIG. 21 graphically illustrates an example stall recovery method, according to at least some embodiments. Search window processing is shown for two consecutive row groups 1202A and 1202B. Search window 1200A represents the search window across the reference frame as row group 1202A is processed. The normal search region height in this example is 13 rows; with four rows in the row group, this yields 16 rows as the search window height, with six rows in the upper window region 1204A and six rows in the lower window region 1206A. The search window 1200A starts at the left of the reference frame, and is advanced across the reference frame to the right by prefetching columns of blocks, as shown by column 1208A. The prefetched columns (e.g., column 1208A) are 16 rows high (the height of the normal search window).

When processing the blocks in row group 1202A, the stage(s) may encounter stall conditions for one or more blocks in the input frame when one or more blocks from the reference frame have not been prefetched into the search window. In the stall recovery method, the stage(s) are allowed to stall. However, block processing at one or more stages of the pipeline may be modified for at least some future blocks by reducing the size of the search region for the blocks, and thus the overall size of the search window, to speed up the pipeline processing, which may allow the pipeline to catch up in throughput and thus maintain a desired overall level of performance. In the example shown in FIG. 21, the height of the search region for the blocks in row group 1202B is reduced from 13 rows to 9 rows; with four rows in the row group, this yields 12 rows as the search window height, with four rows in the upper window region 1204B and four rows in the lower window region 1206B. The search window 1200B starts at the left of the reference frame, and is advanced across the reference frame to the right by prefetching columns of blocks, as shown by column 1208B. The prefetched columns (e.g., column 1208B) are 12 rows high (the height of the reduced search window). Thus, when processing row group 1202B, less reference data is being prefetched and the stage(s) process each block according to a smaller search region, both of which may contribute to speeding up the pipeline and recovering from the stall condition(s) encountered when processing row group 1202A. In at least some embodiments, the search region and search window may be returned to normal size to process a next row group subsequent to row group 1202B.

While FIG. 21 shows the search region and search window as not being reduced until the next row group 1202, in some implementations the search region and search window may instead be reduced for subsequent blocks in the same row group. Also, while FIG. 21 shows the search region and search window as reduced for the entire row group 1202B, in some implementations the search region and search window may only be reduced for part of the row group 1202B.

FIG. 22 is a flowchart of a stall recovery method in which the search region is reduced after a pipeline stall, according to at least some embodiments. The method of FIG. 22 may, for example, be used in the method for prefetching reference data into a search window as illustrated in FIG. 6. Initially when processing a frame in the pipeline, the search region and search window may be set to specified (normal) dimensions. As indicated at 1300, a row group may be processed in the pipeline according to the current search region and search window. One or more stage(s) of the pipeline may be allowed to stall when processing the blocks from the current row group, for example to wait for blocks from the reference frame for which prefetches have been issued but not fulfilled when the blocks from the row group are being processed at the stage(s). At 1302, if stall conditions are encountered when processing the row group, then the search region and search window may be set to a reduced size for the next row group, as indicated at 1304. Otherwise, the search region and search window may be set to the normal size for the next row group, as indicated at 1306.

Turning Off Search Window Processing

In some embodiments, at least some processing of blocks according to reference frame data in the search window may be disabled at one or more stages in response to potential or realized stall conditions resulting from the memory system falling behind in prefetching reference data from the reference frame into the search window. For example, in a pipeline that implements inter-frame estimation, also referred to as motion estimation, as described in the section titled Example search window application, one or more components of the motion estimation engine(s) may be at least temporarily disabled in response to potential or realized stall conditions. While motion estimation is disabled, the pipeline may rely solely on results of an intra-frame estimation, or intra estimation, component that processes blocks according to blocks of pixels already encoded in the frame being processed rather than reference frame data.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 23:
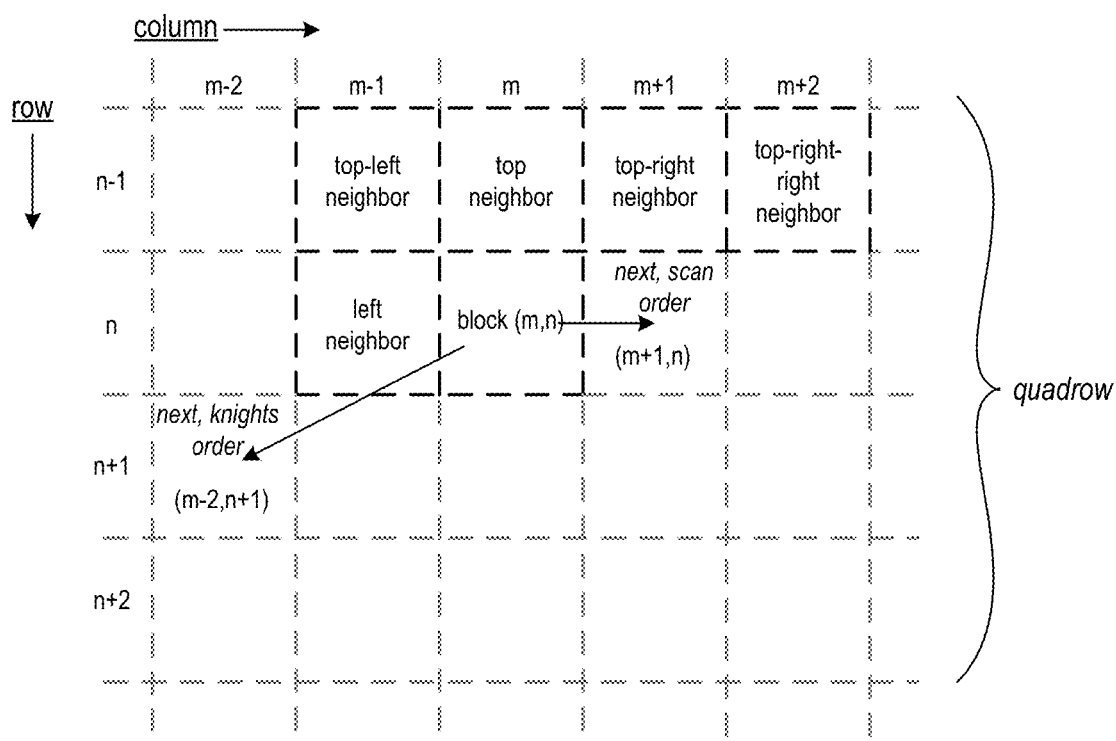
FIG. 23 shows neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 23 shows neighbors of a current block (m,n) from which information may be required–left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 23, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 23, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 23. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 24A and 24B graphically illustrate the knight's order processing method, according to at least some embodiments. For simplicity, these Figures use an example 192×192 pixel frame divided into 144 16×16 pixel blocks, with 12 rows and 12 columns of blocks. However, it is to be noted that the knight's order processing method can be applied to input video frames of any dimensions. In FIG. 24A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 24A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 24A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 24B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 24A, input to the pipeline may begin with the first invalid block to the left of the first block in top row of the first quadrow.

Figure 25A:
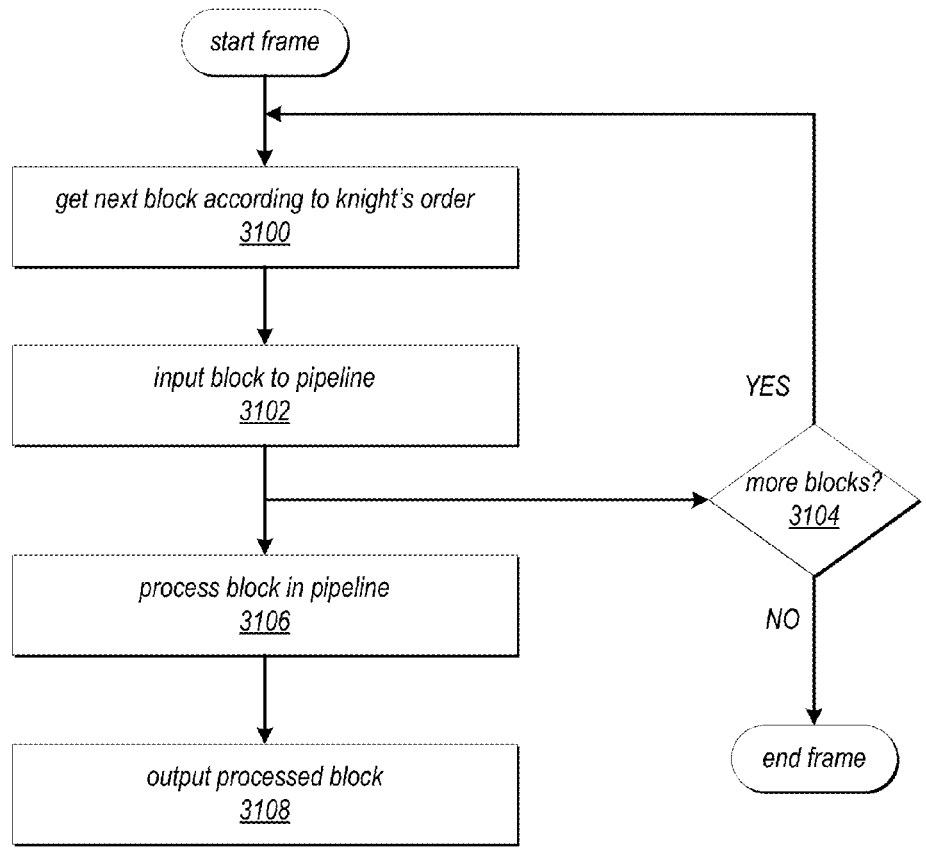
FIGS. 25A and 25B are high-level flowcharts of a knight's order processing method for a block processing pipeline, according to at least some embodiments.
Figure 25B:
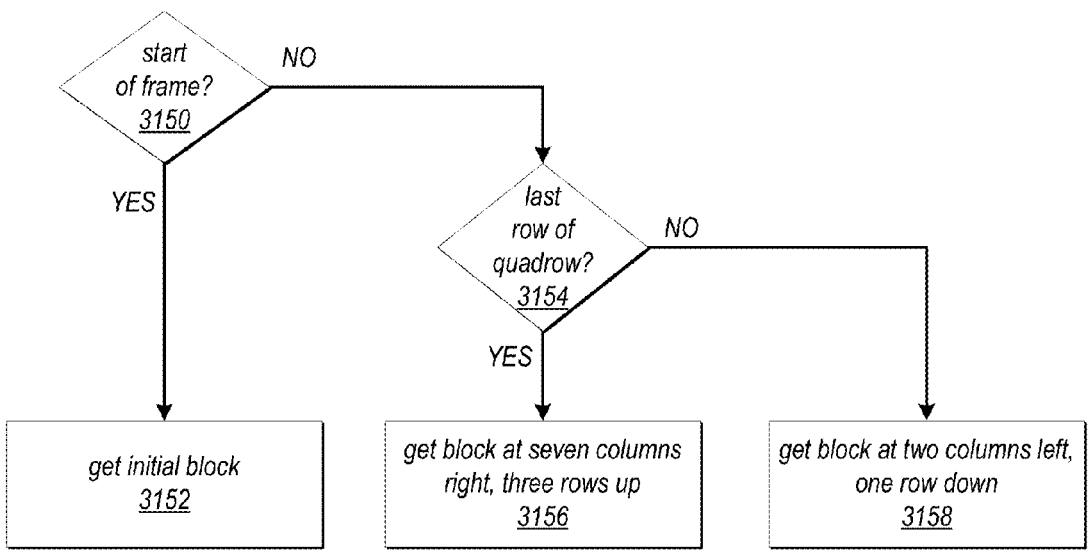

FIGS. 25A and 25B are high-level flowcharts of a knight's order processing method for a block processing pipeline, according to at least some embodiments. In FIG. 25A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 25B is a flowchart of an example algorithm for determining a next input block that that may be implemented by the knight's order processing method, and expands on element 3100 of FIG. 25A. FIG. 25B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Example Pipeline Units

Figure 26A:
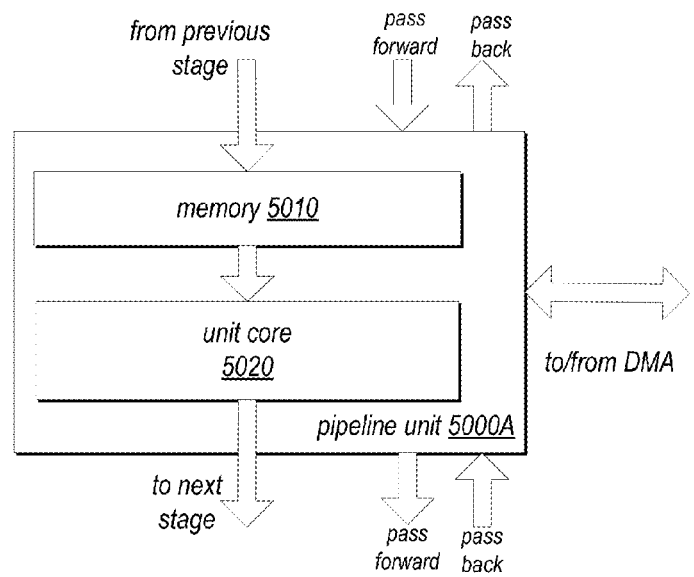
FIGS. 26A and 26B are block diagrams of example pipeline processing units that may be used at the stages of a block processing pipeline that implements one or more of the block processing methods and apparatus as described herein, according to at least some embodiments.
Figure 26B:
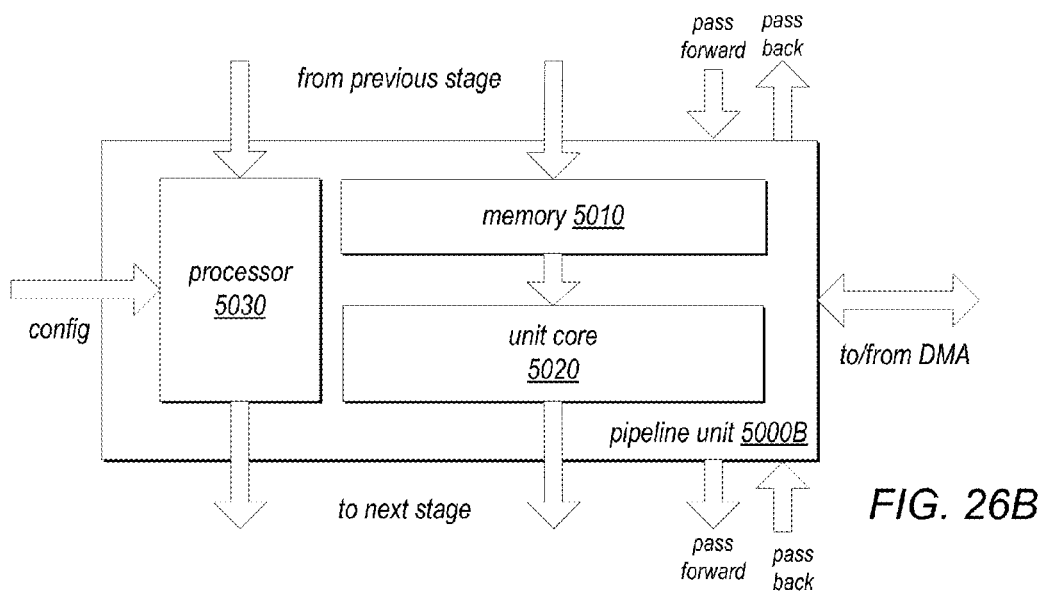
Figure 26C:
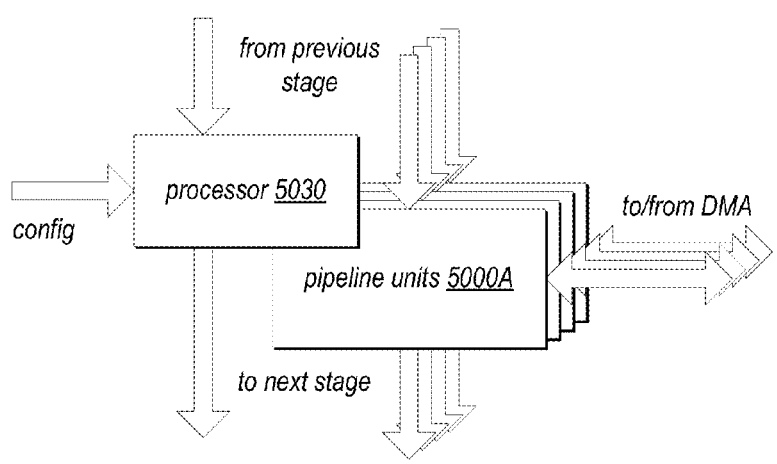
FIG. 26C shows that a single processor may be associated with a group of two or more pipeline units.

FIGS. 26A through 26C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 26A and 26B may be used at each stage of the example block processing pipeline shown in FIG. 27. Note that FIGS. 26A through 26C are not intended to be limiting; a pipeline processing unit may include more or fewer components and features than those shown in the Figures.

As shown in FIG. 26A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 26B, a pipeline unit 5000B, in addition to a memory 5010 and unit core 5020 as shown in FIG. 26A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 26A and 26B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 26C, two or more units 5000A as shown in FIG. 26A may be grouped together and configured to perform an operation in the pipeline. A single processor 5030 may be used to control and/or configure the pipeline units 5000A.

Example Block Processing Pipeline

FIG. 27 is a high-level block diagram of general operations in an example block processing method 6000 for H.264 encoding that may be implemented in stages by a block processing pipeline that may implement one or more of the block processing methods and apparatus as described herein, according to at least some embodiments. A block processing pipeline that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920×1080 pixels, 2.1 megapixels) encoded in YCbCr color space. However, other input video formats may be encoded into H.264 using embodiments of the pipeline in a video encoder apparatus.

Figure 29:
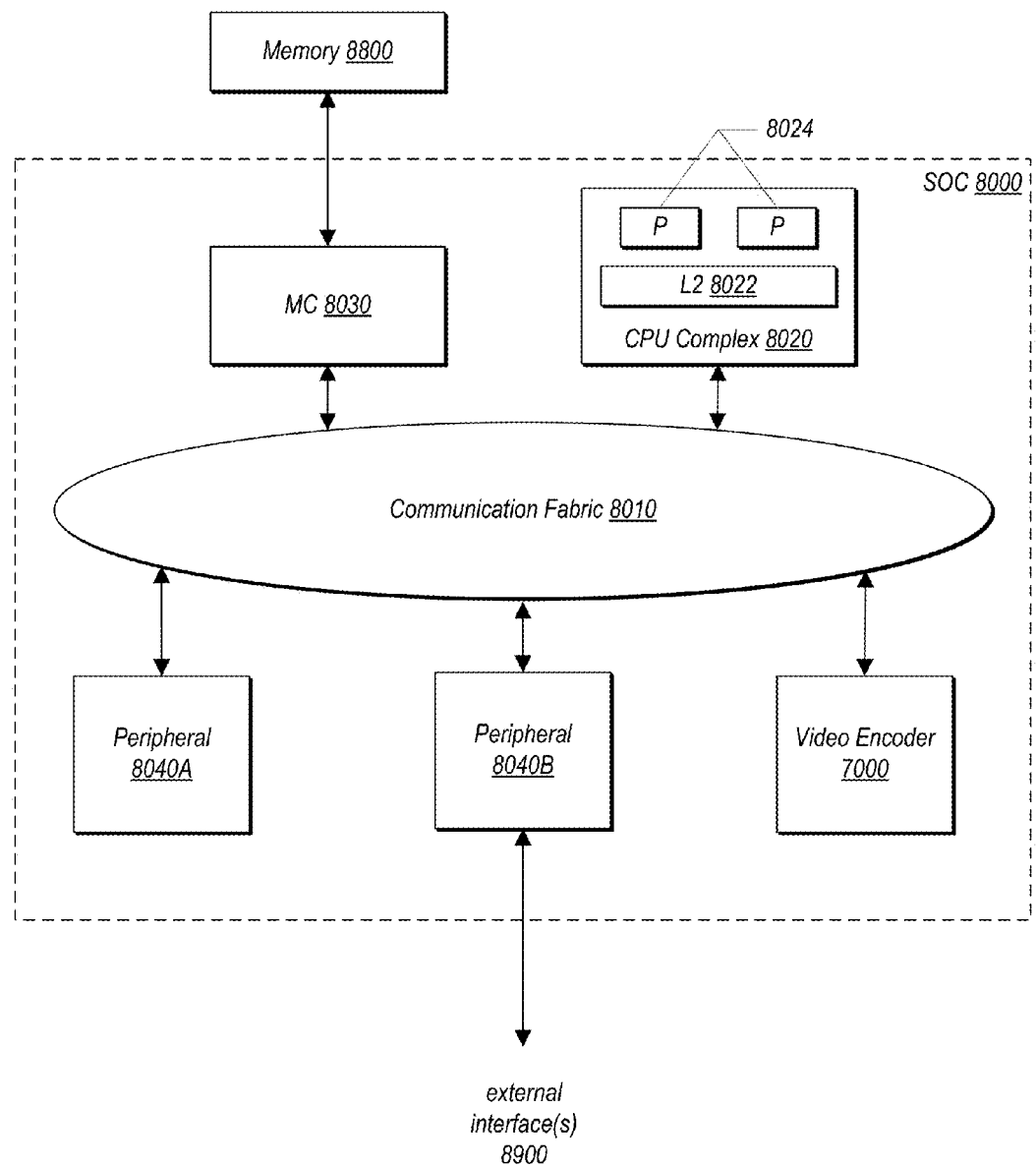
FIG. 29 is a block diagram of one embodiment of a system on a chip (SOC).

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 27, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 28. An example SOC that includes a video encoder apparatus is illustrated in FIG. 29. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 27 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 27 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 26A through 26C. Also note that each general operation shown in FIG. 27 may be subdivided into two or more operations that may be implemented by pipeline units at one, two, or more stages of the pipeline. However, two or more of the operations shown in FIG. 27 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 27 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 6010 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 6050. The transcoder may be implemented as a functional component of the pipeline or as a functional component that is external to the pipeline. In at least some embodiments, the transcoder 6050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 6050 handles stitching the start and end of each row to generate a continuous stream at macroblock row boundaries. In at least some embodiments, the pipeline may embed metadata in the CAVLC output stream to facilitate stitching of the rows by the transcoder 6050.

Example Video Encoder Apparatus

FIG. 28 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 28, or fewer functional components than those shown in FIG. 17. An example block processing method that may be implemented by pipeline 7040 component is shown in FIG. 27. An example a system-on-a-chip (SOC) that may include at least one video encoder apparatus 7000 is illustrated in FIG. 29.

Example System on a Chip (SOC)

Turning now to FIG. 29, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 28. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 29, SOC 8000 may include at least one instance of a video encoder 7000 component, for example a video encoder 7000 as illustrated in FIG. 28 that includes a block processing pipeline 7040 component that implements a block processing method 6000 as illustrated in FIG. 27. Video encoder 7000 may be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 27.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g. to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 29, such as within the CPU complex 8020) may vary from embodiment to embodiment. There may be more or fewer of each component/subcomponent than the number shown in FIG. 29.

Example System

Figure 30:
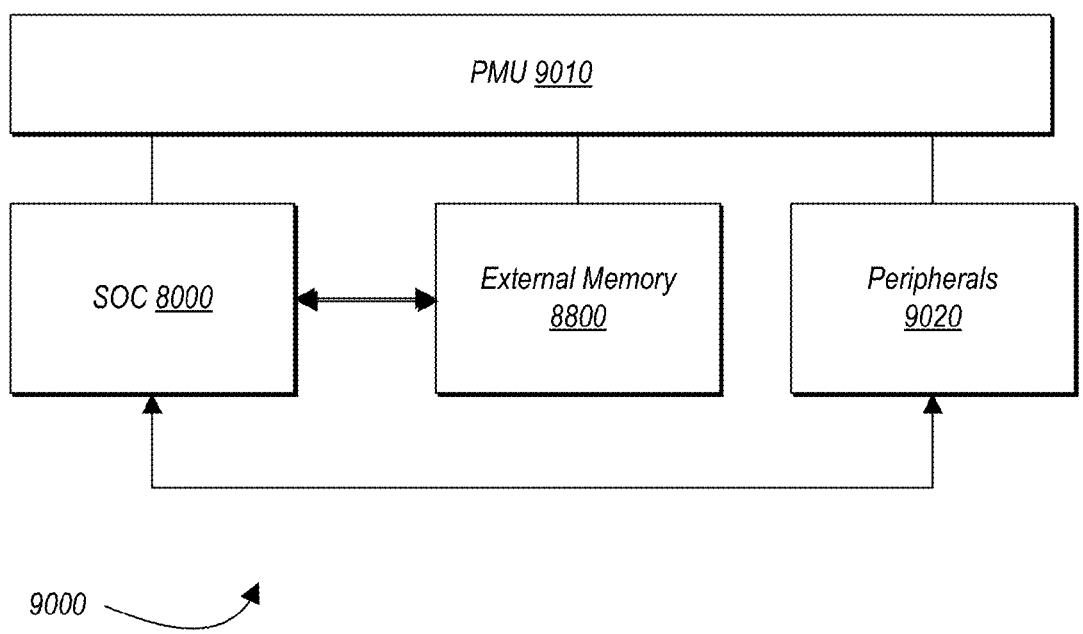
FIG. 30 is a block diagram of one embodiment of a system.

FIG. 30 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline comprising a plurality of stages each configured to perform one or more operations on a block of pixels from a frame passing through the pipeline; and
a memory configured to store a search window including a plurality of columns of blocks of pixels from a reference frame, wherein the search window covers two or more overlapping search regions from the reference frame, each search region including a plurality of blocks;
wherein the block processing pipeline is configured to process blocks of pixels from the frame according to corresponding search regions in the search window, wherein, to process the blocks, the block processing pipeline is configured to:
generate requests to prefetch specified columns of blocks of pixels from the reference frame into the search window, wherein the requested columns of blocks include pixels for processing upcoming blocks from the frame at one or more stages of the pipeline;
monitor the search window to detect conditions in which one or more blocks from the reference frame are not prefetched into the search window for at least one upcoming block from the frame; and
in response to detecting a condition in which one or more blocks from the reference frame are not prefetched into the search window for at least one upcoming block, reduce the search region for one or more blocks from the frame when processing the one or more blocks in the pipeline.

2. The apparatus as recited in claim 1, wherein the condition is a potential condition that is detected prior to occurring, wherein the search region for the one or more blocks is reduced by at least one row of blocks in the vertical dimension, wherein reducing the search region for the one or more blocks in the vertical dimension reduces the height of the column of blocks specified by at least one subsequent prefetch request.

3. The apparatus as recited in claim 1, wherein the condition is detected upon a block from the frame arriving at the one or more stages of the pipeline for processing according to a corresponding search region.

4. The apparatus as recited in claim 3, wherein, to reduce the search region, the block processing pipeline is configured to mark one or more blocks in the search window for which blocks have not been prefetched from the reference frame as invalid, wherein the one or more stages are configured to process the block according to only valid blocks in the search window.

5. The apparatus as recited in claim 3, wherein, to reduce the search region, the block processing pipeline is configured to reduce the search region by at least one column of blocks in the horizontal dimension when processing the block at the one or more stages of the pipeline.

6. The apparatus as recited in claim 5, wherein, to reduce the search region, the block processing pipeline is further configured to reduce the search region by at least one row of blocks in the vertical dimension when processing the block at the one or more stages of the pipeline.

7. The apparatus as recited in claim 3, wherein, upon detecting the condition, the one or more stages are configured to wait until the one or more blocks have been prefetched from the reference frame into the search window before processing the block, wherein the search window is reduced by at least one row of blocks in the vertical dimension for one or more subsequent blocks from the frame when processing the one or more subsequent blocks in the pipeline, wherein reducing the search region for the one or more subsequent blocks in the vertical dimension reduces the height of the column of blocks specified by at least one subsequent prefetch request.

8. The apparatus as recited in claim 1, wherein the apparatus is configured to process blocks of pixels from the frame in the block processing pipeline according to row groups each including two or more rows of blocks from the frame, wherein blocks are input to the pipeline from a row group in an order from a top row of the row group to a bottom row of the row group, wherein, after inputting a block on the bottom row, a next block is input from the top row, and wherein a prefetch request is generated at each block input to the pipeline from the top row of the row group to advance the search window by one column of blocks from the reference frame.

9. A method, comprising:
inputting blocks of pixels from an input frame to a block processing pipeline according to row groups each including two or more rows of blocks from the frame, the pipeline comprising a plurality of stages each configured to perform one or more operations on a block, wherein one or more of the stages are each configured to process each block according to a corresponding search region of pixels from a reference frame;
storing a search window including a plurality of columns of blocks of pixels from the reference frame for access by the one or more stages, wherein the search window includes two or more overlapping search regions from the reference frame;
generating requests to prefetch specified columns of blocks of pixels from the reference frame into the search window, wherein the requested columns of blocks include pixels for processing upcoming blocks from the frame at the one or more stages of the pipeline;
monitoring the search window to detect conditions in which one or more blocks from the reference frame are not prefetched into the search window for at least one upcoming block from the frame; and
in response to detecting a condition in which one or more blocks from the reference frame are not prefetched into the search window for at least one upcoming block, reducing the search region for one or more blocks from the frame when processing the one or more blocks in the pipeline.

10. The method as recited in claim 9, wherein the condition is a potential condition that is detected prior to occurring, wherein the search region for the one or more blocks is reduced by at least one row of blocks in the vertical dimension, wherein reducing the search region for the one or more blocks in the vertical dimension reduces the height of the column of blocks specified by at least one subsequent prefetch request.

11. The method as recited in claim 9, wherein the condition is detected upon a block from the frame arriving at the one or more stages of the pipeline for processing according to a corresponding search region.

12. The method as recited in claim 11, wherein reducing the search region comprises marking one or more blocks in the search window for which blocks have not been prefetched from the reference frame as invalid, wherein the method further comprises the one or more stages processing the block according to only valid blocks in the search window.

13. The method as recited in claim 11, wherein reducing the search region comprises reducing the search region by at least one column of blocks in the horizontal dimension when processing the block at the one or more stages of the pipeline.

14. The method as recited in claim 13, wherein reducing the search region further comprises reducing the search region by at least one row of blocks in the vertical dimension when processing the block at the one or more stages of the pipeline.

15. The method as recited in claim 11, wherein reducing the search region comprises:
   upon detecting the condition, the one or more stages waiting until the one or more blocks have been prefetched from the reference frame into the search window before processing the block; and
   reducing the search region by at least one row of blocks in the vertical dimension for one or more subsequent blocks from the frame when processing the one or more subsequent blocks in the pipeline;
   wherein reducing the search region for the one or more subsequent blocks in the vertical dimension reduces the height of the column of blocks specified by at least one subsequent prefetch request.

16. A device, comprising:
   a memory; and
   an apparatus configured to process video frames and to store the processed video frames to the memory, the apparatus comprising a block processing pipeline that implements a plurality of stages each configured to perform one or more operations on a block of pixels from a frame passing through the pipeline, wherein the apparatus is configured to input blocks of pixels from the frame to the block processing pipeline according to row groups each including two or more rows of blocks from the frame;
   wherein at least one of the stages is configured to:
      locally store a search window including a plurality of columns of blocks of pixels from a processed video frame stored in the memory that is used as a reference frame for the frame in the pipeline, wherein the search window includes two or more overlapping search regions of pixels from the reference frame, each search region corresponding to a block from a row group currently being processed in the pipeline; and
      generate requests to prefetch specified columns of blocks of pixels from the reference frame into the search window, wherein the requested columns of blocks include pixels for processing upcoming blocks from the frame at one or more stages of the pipeline;
   wherein the apparatus is further configured to:
      monitor the search window to detect conditions in which one or more blocks from the reference frame are not prefetched into the search window for at least one upcoming block from the frame; and
      in response to detecting a condition in which one or more blocks from the reference frame are not prefetched into the search window for at least one upcoming block, reduce the search region for one or more blocks from the frame when processing the one or more blocks in the pipeline.

17. The device as recited in claim 16, wherein the condition is a potential condition that is detected prior to occurring, wherein the search region for the one or more blocks is reduced by at least one row of blocks in the vertical dimension, wherein reducing the search region for the one or more blocks in the vertical dimension reduces the height of the column of blocks specified by at least one subsequent prefetch request.

18. The device as recited in claim 16, wherein, to reduce the search region, the block processing pipeline is configured to mark one or more blocks in the search window for which blocks have not been prefetched from the reference frame as invalid, and wherein the one or more stages are configured to process the block according to only valid blocks in the search window.

19. The device as recited in claim 16, wherein, to reduce the search region, the block processing pipeline is configured to reduce the search region by at least one column of blocks in the horizontal dimension when processing the block at the one or more stages of the pipeline.

20. The device as recited in claim 16, wherein, upon detecting the condition, the one or more stages are configured to wait until the one or more blocks have been prefetched from the reference frame into the search window before processing the block, wherein the search window is reduced by at least one row of blocks in the vertical dimension for one or more subsequent blocks from the frame when processing the one or more subsequent blocks in the pipeline, wherein reducing the search region for the one or more subsequent blocks in the vertical dimension reduces the height of the column of blocks specified by at least one subsequent prefetch request.

* * * * *